(12) United States Patent
Jin

(10) Patent No.: US 8,020,216 B2
(45) Date of Patent: Sep. 13, 2011

(54) TAPERED PROBE STRUCTURES AND FABRICATION

(75) Inventor: Sungho Jin, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 636 days.

(21) Appl. No.: 11/914,108

(22) PCT Filed: May 10, 2006

(86) PCT No.: PCT/US2006/018151
§ 371 (c)(1),
(2), (4) Date: Jul. 11, 2008

(87) PCT Pub. No.: WO2007/078316
PCT Pub. Date: Jul. 12, 2007

(65) Prior Publication Data
US 2009/0133171 A1 May 21, 2009

(51) Int. Cl.
*G01Q 70/16* (2010.01)
(52) U.S. Cl. ............ 850/60; 977/875; 977/878; 427/77; 427/282; 204/192.11; 204/192.12
(58) Field of Classification Search .............. 850/60, 850/49; 250/306, 309; 977/878, 875; 73/105; 427/282, 77; 204/192
See application file for complete search history.

(56) References Cited

U.S. PATENT DOCUMENTS

| | | | |
|---|---|---|---|
| 4,536,419 A | 8/1985 | Kubota et al. | |
| 5,041,783 A * | 8/1991 | Ohta et al. | 324/754 |
| 5,171,992 A * | 12/1992 | Clabes et al. | 850/58 |
| 5,548,117 A * | 8/1996 | Nakagawa | 250/423 F |
| 5,702,281 A * | 12/1997 | Huang et al. | 445/50 |
| 5,835,477 A | 11/1998 | Binnig et al. | |
| 5,892,223 A * | 4/1999 | Karpov et al. | 850/59 |
| 6,139,759 A * | 10/2000 | Doezema et al. | 216/11 |
| 6,346,189 B1 | 2/2002 | Dai et al. | |
| 6,401,526 B1 | 6/2002 | Dai et al. | |
| 6,648,712 B2 | 11/2003 | Choi et al. | |
| 6,716,409 B2 | 4/2004 | Hafner et al. | |
| 6,864,481 B2 * | 3/2005 | Kaito et al. | 250/306 |
| 6,956,210 B2 * | 10/2005 | Doan | 850/10 |
| 2005/0103993 A1 | 5/2005 | Guillorn et al. | |
| 2007/0207318 A1 | 9/2007 | Jin et al. | |
| 2008/0098805 A1 | 5/2008 | Jin et al. | |

FOREIGN PATENT DOCUMENTS

| | | |
|---|---|---|
| WO | WO 2006/041691 | 4/2006 |
| WO | WO 2006/135375 | 12/2006 |
| WO | WO 2007/047337 | 4/2007 |

OTHER PUBLICATIONS

Fink, H.W., "Mono-atomic tips for scanning tunneling microscopy", IBM Journal of Research and Development, vol. 30, No. 5, Sep. 1986, pp. 460-465.*

(Continued)

*Primary Examiner* — Jack I Berman
(74) *Attorney, Agent, or Firm* — Perkins Coie LLP

(57) ABSTRACT

Probe structures and fabrication techniques are described. The described probe structures can be used as probes for various applications such as conductance measurement probes, field emitter probes, nanofabrication probes, and magnetic bit writing or reading probes.

23 Claims, 16 Drawing Sheets

OTHER PUBLICATIONS

AuBuchon et al., "Multiple sharp bending of carbon nanotubes during growth to produce zig-zag morphology," Nano. Lett. 4(9): 1781-1784 (2004).

Avouris et al., "Carbon nanotubes: nanomechanics, manipulation, and electronic devices," Applied Surface Science 141: 201-209 (1999).

Banhart, F., "The Formation of a Connection between Carbon Nanotubes in an Electron Beam," Nano Letters 1(6): 329-332 (2001).

Bower, et al., "Plasma-induced alignment of carbon nanotubes", Appl. Phys. Lett., 77(6): 830-832 (2000).

Bower, C. et al., "On-chip vacuum microtriode using carbon nanotubes filed emitters," Appl.Phys. Lett. 80(20): 3820-3822 (2002).

Bower, et al., "Nucleation and growth of carbon nanotubes by microwave plasma chemical vapor deposition", Appl. Phys. Lett., 77(17): 2767-2769 (2000).

Broers et al., "Electron-beam fabrication of 80-Å metal structures," Appl. Phys. Lett. 29(1): 596-598 (1976).

Cheung, C.L. et al, "Growth and fabrication with single-walled carbon nanotube probe microscopy tips," Appl. Phys. Lett. 76(21): 3136-3138 (2000).

Chhowalla, M. et al., "Growth process conditions of vertically aligned carbon nanotubes using plasma enhanced chemical vapor deposition," J. App. Phys. 90(10): 5308-5317 (2001).

Chung, D. et al., "Carbon nanotube electron emitters with a gated structure using backside exposure processes," App. Phys. Lett. 80(21): 4045-4047 (2002).

Colbert et al., "Growth and sintering of fullerene nanotubes," Science 266(5188): 1218-1222 (1994).

Cui, H. et al, "Growth of Carbon Nanofibers on Tipless Cantilevers for High Resolution Topography and Magnetic Force Imagin," Nano Letters 4(11): 2157-2161 (2004).

Dai et al., "Nanotubes as nanoprobes in scanning probe microscopy," Nature 384: 147-150 (1996).

Dekker, C., "Carbon nanotubes as molecular quantum wires," Physics Today, p. 22-28, (May 1999).

Diehl et al., "Self-Assembled, Deterministic Carbon Nanotube Wiring Networks," Angewandte Chemie International Edition 41(2): 353-356 (2002).

Eleftheriou, E. et al., "Millipede—A MEMS-Based Scanning-Probe Data-Storage System," IEEE Transactions on Magnetics 39(2): 938-945 (Mar. 2003).

Fennimore et al., "Rotational actuators based on carbon nanotubes," Nature 424: 408-410 (Jul. 24, 2003).

Frank et al, "Carbon Nanotube Quantum Resistors," Science 280: 1744-1746 (1998).

Griffith, J.E. et al, "Scanning probe metrology", J. Vac. Sci. Technol. A 10(4): 674-679 (1992).

Hafner, J.H. et al, "Growth of nanotubes for probe microscopy tips," Nature 398: 761-762 (1999).

Hall, A. et al, "Simple and efficient method for carbon nanotube attachment to scanning probes and other substrates," Appl. Phys. Lett. 82(15): 2506-2508 (2003).

Hansma et al., "Biomolecular imaging with the atomic force microscope," Annu. Rev. Biophys. Biomol. Struct. 23: 115-139 (1994).

Hsu, C. et al., "Growth of the large area horizontally-aligned carbon nanotubes by ECR-CVD,"Thin Solid Films 420-421: 225-229 (2002).

"IBM Millipede," Wikipedia, the free encyclopedia, http://en.wikipedia.org/wiki/Millipede_memory, 5 pages, [accessed Apr. 14, 2006].

Ionescu-Zaneti et al., "Simultaneos imaging of ionic conductivity and morphology of a micro fluidic system," J. Appl. Phys. 93: 10134-10136 (2003).

Ijima, S., "Helical microtubules of graphitic carbon," Nature 354: 56-58 (1991).

Jang, Y. et al. , "Lateral growth of aligned multiwalled carbon nanotubes under electric field," Sol. State. Comm. 126: 305-308 (2003).

Kim, P. and C.M., "Nanotube Nanotweezers," Science 286: 2148-2150 (1999).

Li et al., "Bottom-up approach for carbon nanotube interconnects," Appl. Phys. Lett. 82(15): 2491-2493 (2003).

Merkulov, et al., "Alignment Mechanism of Carbon Nanofibers Produced by Plasma-Enhanced Chemical-Vapor Deposition". Appl. Phys. Lett. 79(18): 2970-2972 (2001).

Merkulov, V. et al., "Controlled alignment of carbon nanofibers in a large-scale synthesis process," Appl. Phys. Lett. 80(25): 4816-4818 (2002).

Merkulov et al., "Patterned growth of individual and multiple vertically aligned carbon nanofibers," Appl. Phys. Lett. 76(24): 3555-3557 (2000).

Minh et al., "Selective growth of carbon nanotubes on Si microfabricated tips and application for electron field emitters," J. Vac. Sci. Technol. B21(4): 1705-1709 (2003).

Nishijima et al.,"Carbon nanotube tips for scanning probe microscopy: preparation by a controlled process and observation of deoxyribonucleic acid," Appl. Phys. Lett. 74: 4061-4063 (1999).

Noy et al., "Chemical force microscopy," Annu. Rev. Mater. Sci. 27: 381-421 (1997).

Ohnesorge, F. and G. Binnig, "True Atomic Resolution by Atomic Force Microscopy Through Repulsive and Attractive Forces," Science 260: 1451-1456 (1993).

Proksch et al., "Imaging the internal and external pore structure of membrances in fluid: Tapping mode scanning ion conductance microscopy," J. Biophys. 71: 2155-2157 (1996).

Reiss, G. et al, "Scanning tunneling microscopy on rough surfaces: tip-shape-limited resolution", J. Appl. Phys. 67(3): 1156-1159 (1990).

Ren, et al., "Synthesis of large arrays of well-aligned carbon nanotubes on glass", Science 282: 1105-1107 (1998).

Rueckes, T. et al., "Carbon Nanotube-Based Nonvolatile Randon Access Memory for Molecular Computing," Science 289: 94-97 (2000).

Rugar et al. "Magnetic force microscopy: general principles and application to longitudinal recording media," J. Appl. Phys. 68(3): 1169-1183 (1990).

Rugar et al., "Atomic force microscopy," Phys. Today 43(10): 23-30 (Oct. 1990).

Schlaf et al., "Using Carbon Nanotube Cantilevers in Scanning Probe Metrology," Metrology, Inspection, and Process Control for Microlithography XVI, Daniel J.C. Herr, Editor, Proceedings of the SPIE—SPIE The International Society for Optical Engineering, Mar. 3-8, 2002, Santa Clara, California, vol. 4689: pp. 53-57 (Jun. 2002).

Shao et al., "Progress in high resolution atomic force microscopy in biology," Quart. Rev. Biophys. 28: 195-251 (1995).

Snow, E. et al., "Single-wall carbon nanotube atomic force microscope probes," J. Appl. Phys. Lett. 80(11): 2002-2004 (2002).

Stevens et al., "Carbon nanotubes as probes for atomic force microscopy," Nanotechnology 11:1-5 (2000).

Stevens, R., et al., "Improved fabrication approach for carbon nanotube probe devices," Appl. Phys. Lett. 77(21): 3453-3455 (2000).

Tang, J. et al., "Rapid and Reproducilbe Fabrication of Carbon Nanotube AFM Probes by Dielectrophoresis," Nano Letters 5(1): 11-14 (2005).

Tans, S. et al., "Room-temperature transistor based on a single carbon nanotube," Nature 393: 49-52 (1998).

Thess et al., "Crystalline Ropes of Metallic Carbon Nanotubes," Science 273: 483-487 (1996).

Ural, A. et al., "Electric-field-aligned growth of single-walled carbon nanotubes on surfaces," Appl. Phys. Lett. 81(18): 3464-3466 (2002).

Vettiger et al., "Ultrahigh density, high-data-rate NEMS-based AFM data storage system," J. Microelectron. Eng. 46: 11-17 (1999).

Wei, B. et al., "Reliability and current carrying capacity of carbon nanotubes," Appl. Phys. Lett. 79(8): 1172-1174 (2001).

Wong et al., "Carbon nanotube tips: High-Resolution probes for imaging biological systems," J. Am. Chem. Soc. 120: 603-604 (1998).

Yao, Z. et al., "Carbon nanotube intramolecular junctions," Nature 402: 273-276 (1999).

Ye, Q. et al, "Large-scale fabrication of carbon nanotube probe tips for atomic force microscopy critical dimension imaging applications," Nano Letters 4(7): 1301-1308 (2004).

Yenilmez et al., "Water scale production of carbon nanotube scanning probe tips for atomic force microscopy," Appl. Phys. Lett. 80: 2225-2227 (2002).

Zhu, W. et al., "Large current density from carbon nanotube field emitters," Appl. Phys. Lett. 75(6): 873-875 (1999).

\* cited by examiner

TAPERED PROBE STRUCTURES AND FABRICATION

STATEMENT AS TO FEDERAL FUNDING

The technical features described in this application were developed with support from the U.S. government under grant DMI-0210559 awarded by the National Science Foundation Nanoscale Interdisciplinary Research Team. The U.S. government has certain rights in the described technical features.

RELATED PATENT APPLICATION

This application is a national stage application of and claims the benefit of PCT/US2006/018151 filed on May 10, 2006, which claims the benefit of U.S. Provisional Patent Application No. 60/679,698 entitled "Geometry- and Conductance-Controlled Nanoprobe Structures" and filed May 10, 2005. Both applications are incorporated by reference as part of the specification of this application.

BACKGROUND

This application relates to microstructures and nanotechnology.

Microfabrication techniques can be used to fabricate various microstructures on substrates, including micro or nano probes with fine probe tips used in sensing, testing, data memory and other applications. The geometry and dimension of the probe tip, such as the sharpness, size and shape of the probe tip, can affect the performance of a device using such a probe tip, such as the spatial resolution in atomic force microscopy (AFM) imaging and the storage density and operation of a probe-based information storage system. Examples of micro probes and their applications are published in literature, including Rugar et al., *Phys. Today* 43(10):23-30 (1990); Noy et al., *Annu. Rev. Mater. Sci.* 27:381-421 (1997); Hansma et al., *Annu. Rev. Biophys. Biomol. Struct.* 23: 115-139 (1994); Shao et al., *Quart. Rev. Biophys.* 28:195-251 (1995); Binnig et al., U.S. Pat. No. 5,835,477; and Vettiger et al., *J. Microelectron. Eng.* 46:11-17 (1999).

Some commercially available AFM probe tips are made of silicon or silicon nitride ($Si_3N_4$) which is microfabricated into a pyramid configuration. Such probes can be made to have a tip radius of curvature in the regime of about 50 nm regime and exhibit a limited lateral resolution. The rigid pyramid shape can be difficult to access to narrow or deep structural features.

Advances in carbon nanotube (CNT) science and technology now allow carbon nanotubes to be used in micro probe tips. One example of a carbon nanotube probe uses a "thin-probe-on-pyramid" configuration where a carbon nanotube is formed on a pyramid base as the probe. See, for example, U.S. Pat. Nos. 6,716,409 and 6,401,526; Dai et al., *Nature* 384: 147-150 (1996); Colbert et al., *Science* 266: 1218-1222 (1994); Wong et al., *J. Am. Chem. Soc.* 120:603-604 (1998); Nishijima et al., *Appl. Phys. Lett.* 74:4061-4063 (1999); Stevens et al., *Nanotechnology* 11:1-5 (2000); Yenilmez et al., *Appl. Phys. Lett.* 80:2225-2227 (2002); and Minh et al., *J. Vac. Sci. Technol.* B21(4):1705-1709 (2003)). Carbon nanotubes can be grown by using the chemical vapor deposition (CVD) technique in which hydrocarbon gas is decomposed at a high temperature often assisted by DC or RF plasma.

The long and slender geometry of carbon nanotubes provides a high aspect ratio and can be advantageously used for probing narrow and deep features. The elastically compliant behavior of high aspect ratio nanotubes may be beneficial in certain applications where the probe tip can directly touch a surface and bend without being damaged or damaging the surface in contact when the contact force is within a certain limit. Even when the stress encountered by the nanotube probe reaches beyond the limit or a critical force, the nanotube can elastically buckle and recover to accommodate the strain, thus limiting the maximum force exerted onto a sample being imaged by the AFM probe. This feature of the CNT probe tip can be useful when the samples being examined are mechanically soft or fragile such as some biological surfaces. The CNT can be attached to an AFM probe tip by several different means, for example, using acrylic adhesives under optical microscope, carbon deposition in a scanning electron microscope (SEM), or electric arc discharge technique. In situ growth of carbon nanotubes directly on AFM tips were also reported in U.S. Pat. Nos. 6,716,409 and 6,401,526, Yenilmez et al. and Minh et al.

SUMMARY

This application describes, among others, implementations and fabrication of nano probe structures with sharp probe tips used in sensing devices, testing devices, data memory devices and other applications. Examples are provided for methods and compositions of geometry- and conductance-controlled probe tip structures, and for methods for producing such structures for improved probes for use in metrology, conductance measurement and information storage or readout.

One method described in this application, for example, includes placing a mask membrane comprising a through hole and a substrate to be processed at two different positions relative to each other within a deposition chamber, directing a flow of a deposition material towards the mask membrane and the substrate through the through hole of the mask membrane to deposit the deposition material onto the mask membrane including the through hole and the substrate, and controlling a duration of the flow of the deposition material to form a tapered structure on the substrate whose dimension reduces along a direction from the substrate towards a tip of the tapered structure.

As another example, a device described in this application includes a substrate, and a tapered structure made of either a magnetic material or an electrically conductive material and having a large base fixed to the substrate and a tapered body extending from the large base to a small tip. The large base has a dimension greater than 100 nm and the tip has a radius of curvature from 0.1 nm to 10 nm.

As a further example, this application describes a device that includes a substrate, a carbon nanotube formed over the substrate and a coating layer formed over the carbon nanotube. The carbon nanotube includes a first portion and a second portion bent from the first portion.

These and other implementations and examples are described in greater detail in the attached drawings, the detailed description and the claims.

DETAILED DESCRIPTION

Techniques and devices described in this application may be implemented to provide micro probes with well-controlled tip geometry, dimension and material characteristics (such as electrical or magnetic properties) for the applications that probes are designed. The probes may be designed for a variety of applications including AFM metrology probe, magnetic force microscope (MFM) probe, mechanical tester probe, nano-indent mechanical tester, electrical conductance probe, heat-assisted write probe, or magnetic recording probe. Examples of the probes or nanoprobes in this application, the cores of the probe tips may be made from a metallic material (elemental metal or alloy based), a ceramic or a semiconductor material (such as silicon nitride, silicon oxide, aluminum oxide, silicon, etc.), or one or more carbon nanotubes. The probes may be configured for various applications, including applications for metrology, nano-conductance measurements, nanofabrication of nanostructures or nano-writing of storage information. The surface of a probe tip may be coated with a different coating material to provide a desired property to the probe tip, such as an electrically conductive coating for enhanced surface electrical conductivity or a magnetic coating for impart a desired magnetic property to the probe tip.

Probes with nanoscale dimensions can be fragile. One way of making the probe tip less fragile as described herein is to make the probe geometry tapered gradually into a nanocone shape. For example, one desirable configuration is to a very sharp tip for high resolution AFM imaging and other applications, where the tip radius of curvature may be at most 15 nm, 5 nm or less, and even 2 nm or less. For the purpose of mechanical sturdiness of the nanotube probe in the absence of AFM pyramid base structure, the cone structure can be designed to have a substantial base cone diameter. For example, the cone base diameter may be greater than 100 nm, 300 nm, or even 500 nm in some applications. To simultaneously provide a small-diameter, sharp tip for high resolution AFM analysis and mechanical stability with a large diameter cone base, a certain minimal high aspect ratio of the nanocone structure is desirable. For example, the ratio of the nanocone length and the base diameter may be at least 3, 5, or 10 in some applications. Such a high aspect ratio of nanocone probe tip is also beneficial in probing shallow crevices or narrow tracks.

Figure 1:
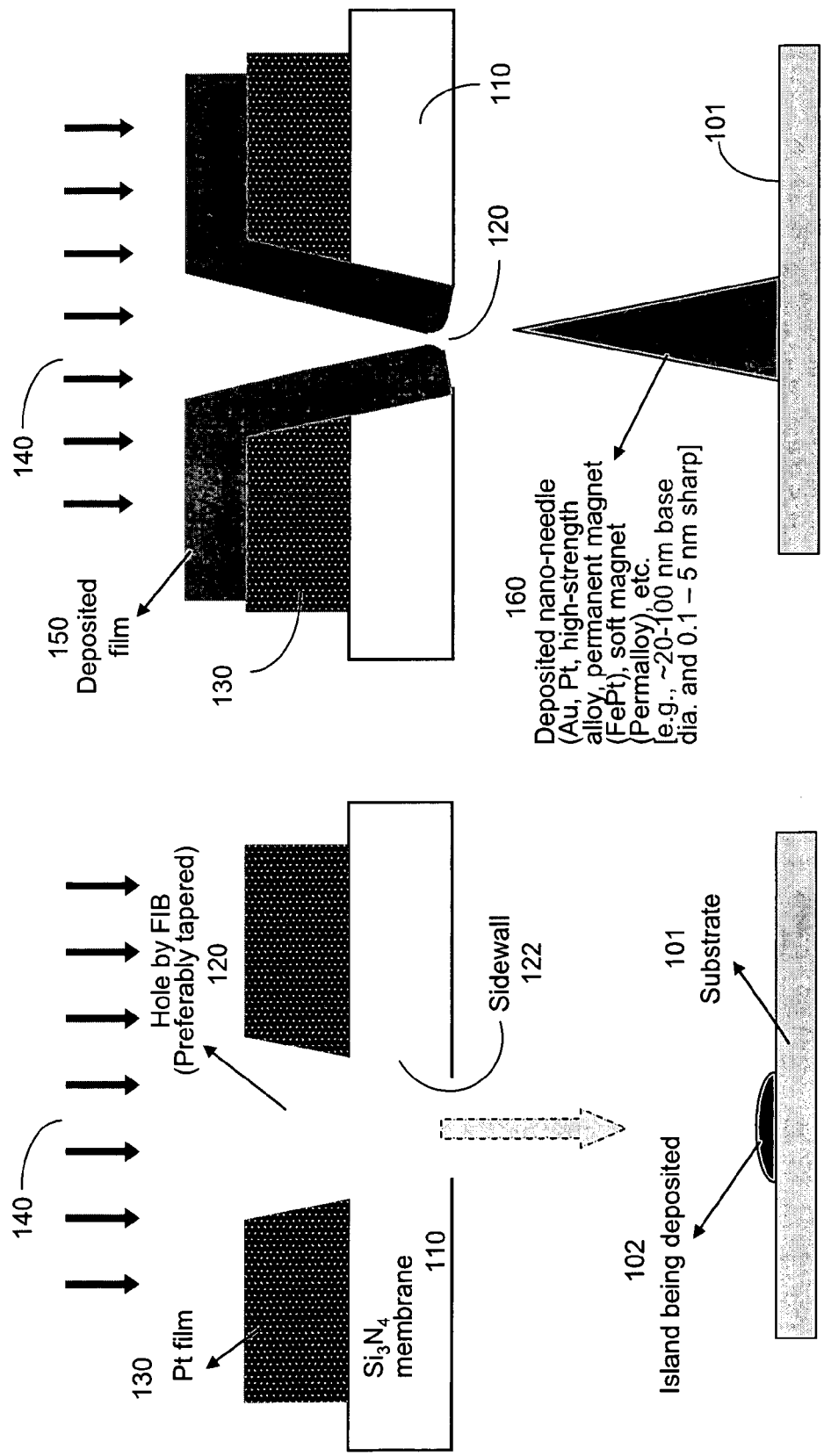
FIG. 1 schematically illustrates processing steps of fabrication a sub-20 nm sharp-tipped nano needle by metal, alloy or compound deposition through gradually-clogging nanopores.
Figure 2:
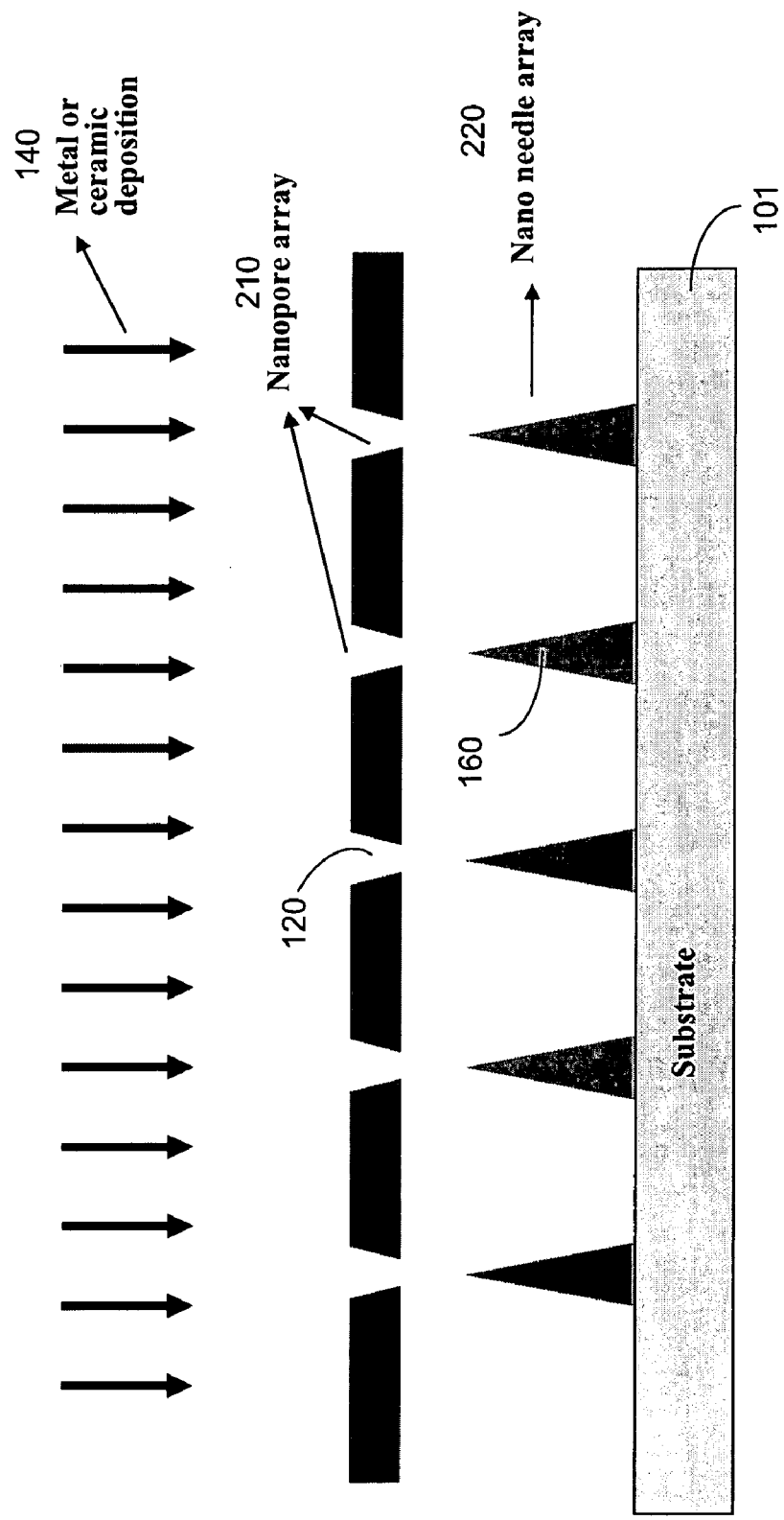
FIG. 2 schematically illustrates a processing step of obtaining an array of bent nano-needle probes by deposition through an array of nanopores in a mask membrane.
Figure 3:
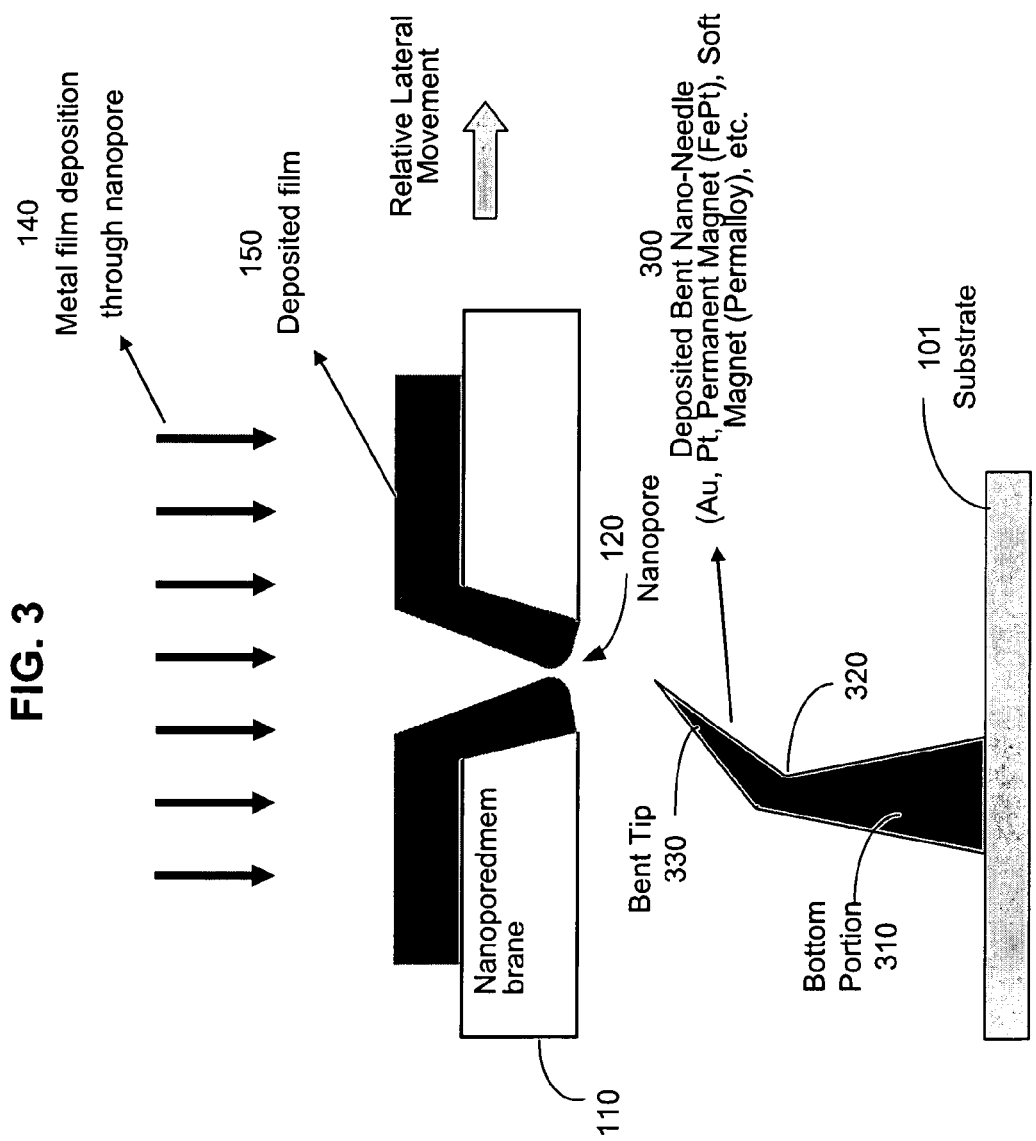
FIG. 3 schematically illustrates processing steps of obtaining a bent nano needle by relative lateral movement of nanopore mask membrane and deposited nano needle.

FIGS. 1, 2 and 3 illustrate exemplary fabrication techniques for fabricating individual probes or probe arrays by controlling the spatial distribution of a material during the deposition process. A probe material is deposited at a selected location on the substrate to form an initial island and the flow of the material to be deposited onto the initial island is controlled to reduce the flow rate and the spatial spread as the deposition progresses so that deposited structure is tapered with the height until a sharp tip is formed at the top when the deposition is terminated.

FIG. 1 illustrates the deposition control apparatus and the deposition processing steps of fabricating a sub-20 nm sharp-tipped nano needle by metal, alloy or compound deposition through a gradually-clogging nanopore in a deposition control mask membrane 110. In a suitable deposition chamber, a substrate 101 on which one or more probes are to be formed is placed on the substrate holder. The deposition control mask membrane 110 is placed above the substrate 101 to filter and control the flow of the deposition material to be deposited on the substrate 101. Notably, the deposition control mask membrane 110 includes one or more small apertures or through holes 120 referred to as "nanoprores" through which the deposition material is directed towards the substrate 101. The shape and size of each nanopore 120 and the spacing between the deposition control mask membrane 110 and the substrate 101 can be designed and controlled according to the parameters of the probe to be formed on the substrate 101.

One example for the deposition process is the sputter deposition. A target material slab made of a deposition material to be deposited on the substrate 101 for forming the probe is bombarded by charged ions to sputter the deposition material via momentum transfer towards the substrate 101. The deposition control mask membrane 110 is placed between the target material slab and the substrate 101 to control the deposition of the sputtered deposition material onto the substrate 101. In FIG. 1, the sputtered deposition material is represented by a flow 140 from the target material slab towards the substrate 101. At the beginning of the sputter deposition, the sputtered deposition material passes through the nanopore 120 to form an initial island 102 on the substrate 101 while the sputtered deposition material is deposited on the upper surface and inner walls of the nanopore 120 as a layer 150. As the deposition progresses, the initial island 102 grows in height and the deposited material 150 builds up at the nanopore 120 and begins to clog the passage of the nanopore 120. This clogging at the nanopore 120 spatially restricts the deposition material to the substrate 101 and the flux of the deposition of the material to the substrate 101 so that the passage of the nanopore 120 and the flux of the deposition material towards the substrate 101 decrease with time. As a result, the deposited material over the initial island 120 grows small in its lateral profile as the height of the deposited material increases. Accordingly, a tapered structure 160 with an appearance of a sharp needle or cone is formed as a tapered probe and the sputter deposition is terminated when the tip reaches a desired sharp shape. The tapered structure 160 has a dimension which reduces along a direction from the substrate 101 towards the tip of the tapered structure 160. In this specific example, the deposition control mask membrane 110 is fixed in position relative to the substrate 101 during the deposition process so that the final tapered probe 160 is in a upright position above the substrate 101.

The deposition control mask membrane 110 may be made of a suitable material such as a silicon nitride (e.g., $Si_3N_4$) substrate as illustrated. The one or more nanopores 120 in the deposition control mask membrane 110 can be made by a variety of techniques including the focused ion beam (FIB) etching, electron beam lithography, laser beam lithography using lasers such as ArF or KrF ion lasers, extreme UV (EUV) lithography, or various other nano-patterning methods including reactive ion etching (RIE) or chemical etch with a covering mask in the form of a shadow mask, monolayer placed nano-islands or nano-particles.

In some implementations, the apertured deposition control mask membrane 110 can be made by a focused ion beam (FIB) etch process in scanning electron microscope (SEM) environment. Accordingly, a conductive coating 130 such as a Pt coating can be pre-deposited onto the Si-nitride mask membrane layer 110 placed on Si support frame in order to metallize the surface and to allow good SEM imaging without too much charging effect on the insulating silicon nitride. Such a good imaging in turn allows a better control of hole drilling during the subsequent FIB etch process. The nanopore 120 may be configured to have different side wall profiles 122. As illustrated in FIG. 1, one side wall profile 122 for the nanopore 120 is a tapered profile so that the aperture size of the nanopore 120 decreases in the direction towards the substrate 101. In other implementations, the nanopore 120 may have straight side wall profile 122.

One of the main advantages of such a nano needle (or a nanocone) probe 160 is that the desired magnetic metal/alloy or compound, or suitable conductive or wear-resistant material can be directly made into nanocone or nano needle geometry, instead of just as a thin film coating. Therefore, a wide range of materials may be used as the deposition material to form the nano probe 160 with a desired material property. For example, soft magnetic probe nanocones or nano-needles, permanent magnet needles, electrically conductive needles, mechanically strong conductive probes can be deposited on the substrate 101.

FIG. 2 shows that a mask membrane 210 with a multitude of nanopores 120 in an array may be used to form an array 220 of nanocones or nano-needles 160 over the substrate 160.

In some applications, a bent nanocone or an array of bent needles may be preferred over the vertically straight nanocones or nano needles shown in FIGS. 1 and 2. FIG. 3 shows a process of making a tapered probe with a bent top tip 330 by changing the relative position between the apertured deposition control mask membrane 110 and the substrate 101 during the deposition process. A control mechanism is provided in the deposition chamber to control the relative position and relative motion between the apertured deposition control mask membrane 110 and the substrate 101. In operation, the relative position between the apertured deposition control mask membrane 110 and the substrate 101 is fixed at an initial position to place the base of the nano probe 300 to be formed at a desired location on the substrate 101. After a period of deposition, a tapered, upright base portion 310 of the probe 300 is formed. Next, a relative lateral movement between the nanopore mask membrane 110 and the substrate 101 (i.e., the one or more nano needles being deposited thereon) is initiated while the sputter deposition continues. For example, a motion control device may be engaged to the either of the nanopore mask membrane 110 and the substrate 101 to gradually move the nanopore 120 away from the initial position above the base portion 310 towards the direction to which the tip is intended to bend. In the course of this relative motion, the deposition continues and the newly deposited material grows from the top 320 of the base portion 310 at a slanted angle to form the bent tip 330. Upon formation of the desired bent tip 330, the relative motion and the deposition are terminated.

In the above and other nano probes formed above a substrate described in this application, a strong adhesion of the nano probes on the substrate is desirable for achieving long term reliability of such nanoprobes. A number of techniques may be used to enhance the adhesion between a nano probe and the underlying substrate. As specific examples, the following sections describe three different techniques for improving the adhesion properties of nanoprobes, either straight or bent, made by techniques described herein by incorporating a structure of: 1) thin film or thick film locking layer; 2) chemically reacted interface region between the bottom portion of the nano probe and the substrate; and 3) a gradient composition nanoprobes comprising at least one common element as in the substrate material.

Figure 4:
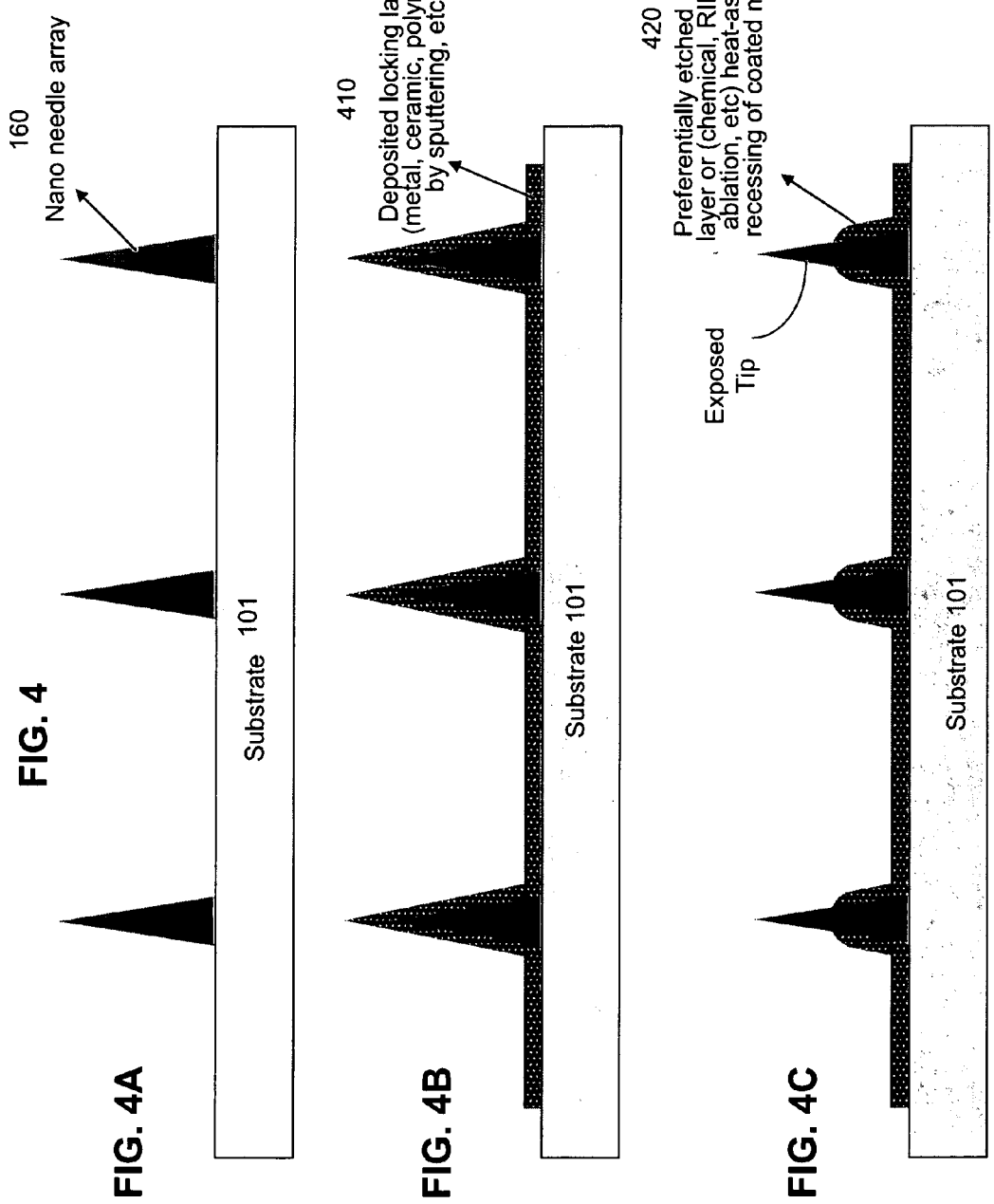
FIG. 4a-c schematically represents an adhesion-improved nano needle probe array comprising a deposited locking layer and preferential etching or recessing to expose the probe tips.

FIG. 4 illustrates the structure and fabrication of an adhesion-improved nano needle probe array comprising a deposited locking layer and preferential etching or recessing to expose the probe tips. FIG. 4A shows a substrate 101 fabricated with an array of nano probes 160 using, e.g., the techniques described in this application, including the fabrication techniques shown in FIGS. 1-3. Next, a locking layer 410 or 420 may be formed over the nano probes 160 and the substrate 101 to cover at least the base or lower portion of each nano probe 160 and the top surface of the substrate 101 to enhance the adhesion of the nano probe 160 on the substrate 101.

Referring to FIG. 4B, the locking layer 410 may be a metal, alloy, compound, ceramic, or semiconductor material depending on other usefulness of the coating material. One or more of the highly conductive material, dielectric material, wear resistant material, corrosion resistant material, semiconductor material, magnetic material, or piezoelectric material can be applied. In some implementations, the desired thickness of the locking layer can be in the range of 50-50,000 nm, preferentially 100-2,000 nm. The deposition of the nanoprobe locking layer 410 can be carried out by a suitable technique. For example, physical vapor deposition like sputtering, ion beam deposition, evaporation, chemical vapor deposition, electrodeposition or electroless deposition can be used. In the illustrated example, the locking layer 410 covers the entirety of the exterior of each nano probe 160.

The locking layer deposition may be designed to use a combination of thin films to impart different properties with different thin films to the final nano probes. For example, the locking layer may include a first conductive film to first impart electrical conductivity on the probe surface and the substrate surface, followed by electroplating deposition to add a second relatively thick layer (e.g., at least 1000 μm thick electrodeposit) for stronger locking performance. After deposition of the locking layer, an annealing heat treatment can optionally be applied to reduce defects and residual stresses for improved soft magnetic properties.

In some application where the exposure of the original probe tip is desired, preferentially etching of the locking layer by chemical etching, reactive ion etching (RIE), laser ablation, etc. may be used to remove a portion of the locking layer from the tip area of each nano probe to form the locking layer 420 as shown in FIG. 4C. For example, once an electrically conductive coating is added as a locking layer, the probe on the substrate can be subjected to electrochemical etching, as the concentration of current density at the tip area tends to preferentially etch the coating material and expose the tip. If the locking layer is not chemically reactive and not strongly adherent, e.g., novel metals such as Au or Pt deposited on the nano probe (but avoiding the use of an adhesion promoting interface layer like Ti or Cr), a subsequent annealing treatment, e.g., at 300-900° C., can be applied to cause retraction of the locking layer material from the very tip due to the surface tension, exposing the probe tip. Laser ablation or laser heating can also be utilized to preferentially remove the locking layer near the tip.

Figure 5:
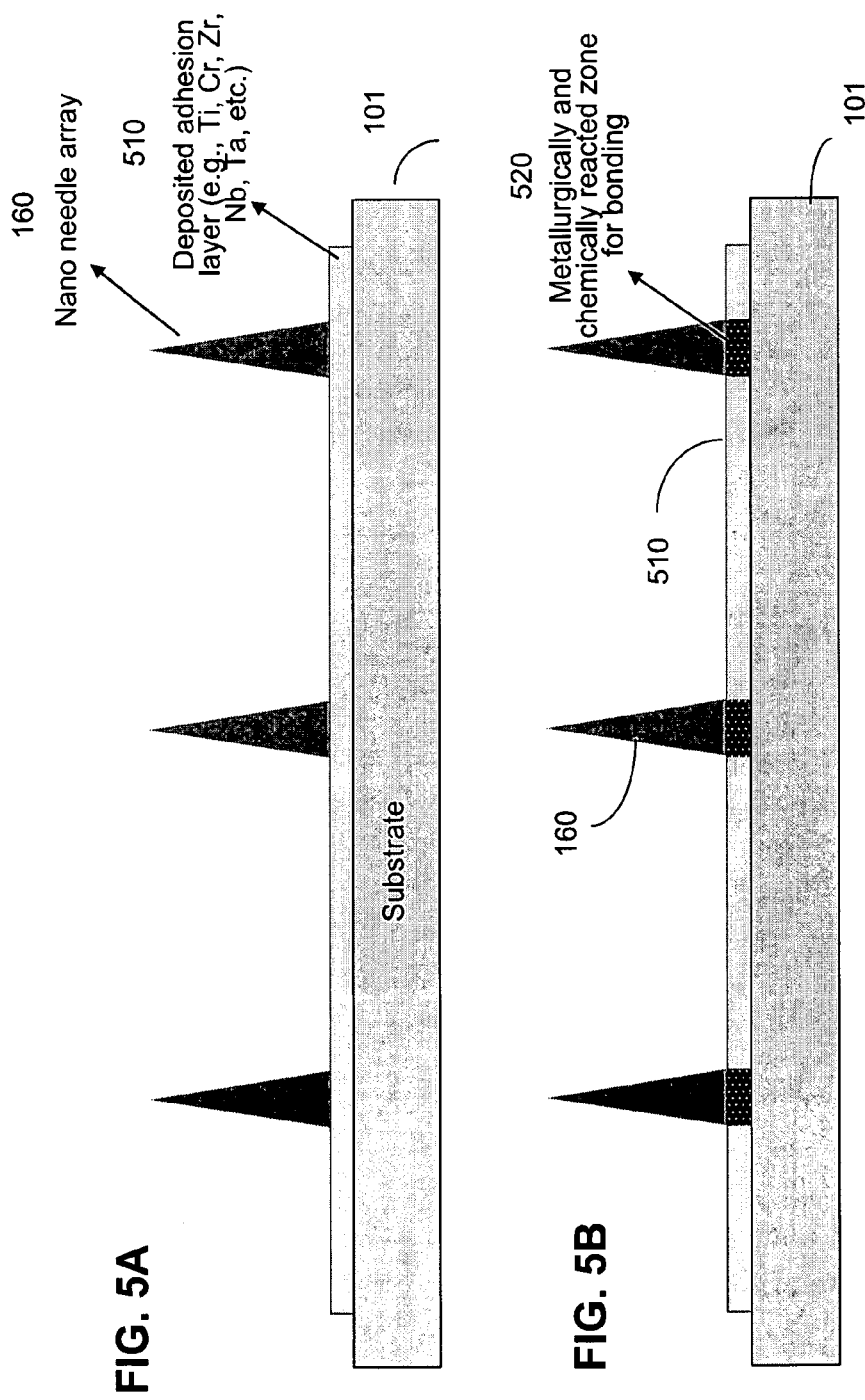
FIG. 5a-b illustrates an example of an adhesion-improved nano needle probe array comprising chemically reacted interface adhesion zone.

FIG. 5 shows one example of using a chemically reacted interface region between the bottom portion of a nano probe and the substrate to construct an adhesion-improved nano needle probe array. In FIG. 5A, an adhesion layer 510 is first deposited over the substrate 101. In some implementations, this adhesion layer 510 can be a reactive metallic layer. The thickness of this layer 510 may be 5-500 nm and may be formed from a metallic material such as Ti, Cr, Zr, Nb, Ta, and others. Next, the deposition of the nano probes 160 is performed to form the array of the nano probes 160 over the adhesion layer 510. Then, an annealing treatment is applied to the structure in FIG. 5A to cause diffusional alloying and bonding of the probe bottom of each probe 160 with the reactive layer 510. As illustrated in FIG. 5B, the annealing causes a chemically reacted interface adhesion zone 520 to be formed at the interfacing region between the probe bottom of each probe 160 with the reactive layer 510.

Figure 6:
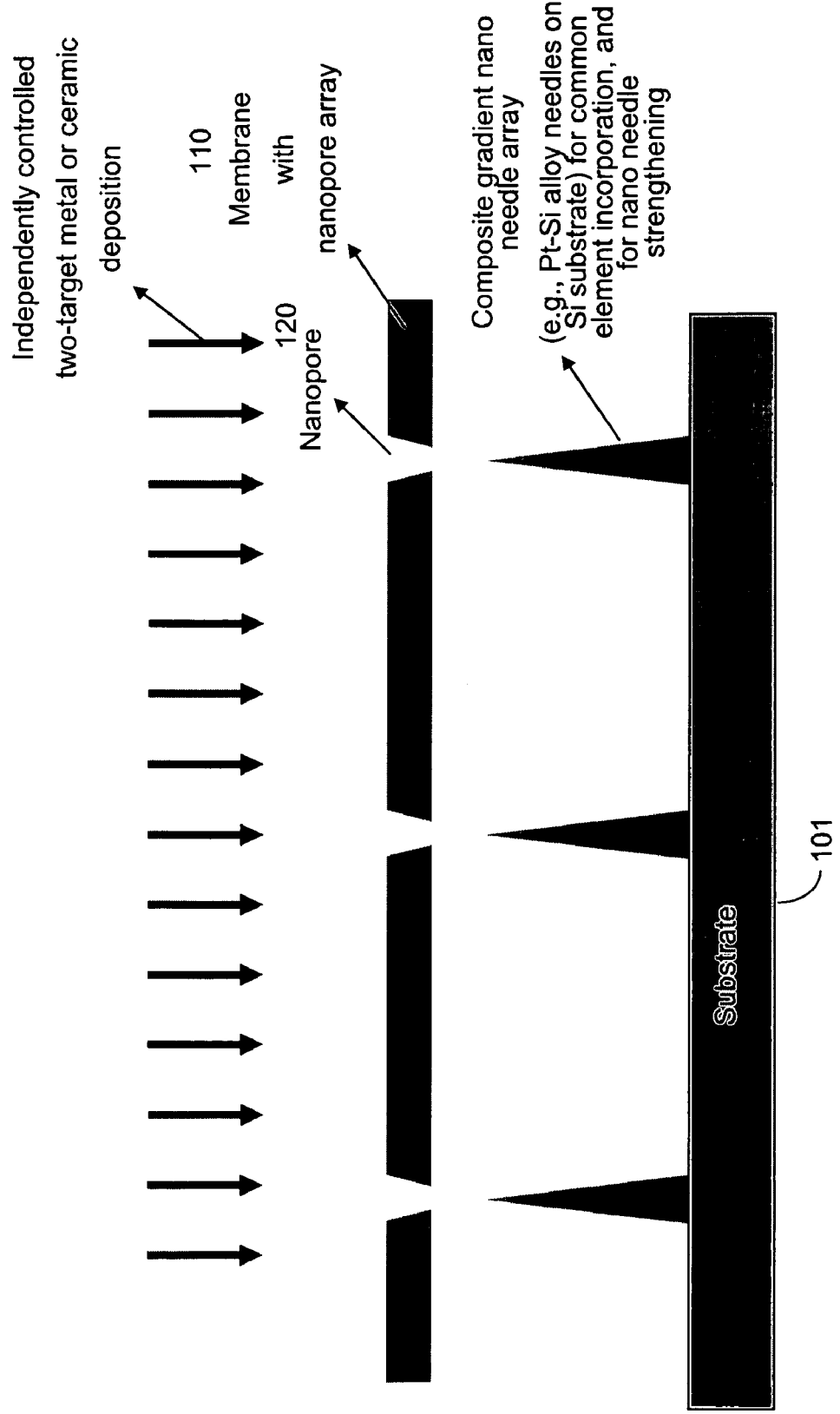
FIG. 6 illustrates an example of an adhesion-improved nano needle probe array comprising nano needles with gradient composition with adherent interface zone containing a common chemical species both in the probe and the substrate.

Referring to FIG. 6, an example of an adhesion-improved nanoprobe array is shown to use a gradient composite nanoprobe material comprising at least one common element as in the substrate material. The material used in the nano needles or probes 160 includes at least two different constituent materials where one constituent material includes a common chemical species both in the probe and the substrate and has a spatially gradient composition whose concentration of the common chemical species decreases with a distance from the adherent interface zone with the substrate 101. In preparation of such a composition gradient nanoprobe, a thin film deposition of two or more target materials, e.g., a two-target thin film co-deposition, may be used to form the nanoprobe over the substrate by sputtering or evaporation deposition. The concentrations of the two or more target materials are independently controlled to achieve a desired spatial gradient in concentration for each target material. One approach is to control the power from each of the targets by controlling the acceleration of the bombarding ions directed to each target material. For example, if a strongly adherent Pt nanoprobe on a Si substrate is desired, co-sputtering of Si and Pt can be applied with a Si-rich deposition of a Pt—Si alloy at the beginning and a gradual shift toward deposition of a Pt-rich Pt—Si alloy as the deposition progresses. In some implementations, the gradient region may not span the whole length of the nanoprobe and may constitute only the lower portion of the nanoprobe. This gradient region has a high concentration of silicon at the interface with the silicon substrate and promotes strong bonding at the interface with the silicon substrate. In some implementations, such a gradient region of at least 20 nm thick, or at least 100 nm thick may be used with the remaining nanoprobe regions above the gradient region having predominantly pure Pt. Since the gradient region contains both Si and Pt, the common elements for the substrate and the nanoprobe, a desirably stronger bonding of the nanoprobe is provided.

In the fabrication techniques shown in FIGS. 1-3, the geometry and dimension of a nanoprobe is controlled by using the nanopore 120 in the deposition control mask membrane 110 to control the deposition. In order to further enhance the sharpness of the probe tip, an electron field emission process may be further applied to sharpen the tip of a nano probe or nanotube that is either made of a metallic material or coated with a metallic exterior layer. A DC electrical field may be applied to the nano probe and a concentrated electric field can be generated near the tip of the nano probe as a field emitting tip. The emission of electrons at the probe tip tends to cause tip sharpening by diffusional mass movement due to electric field applied field and high temperature caused by intense field emission current. In various devices using electron field emitters, this tip sharpening can be undesirable and is considered as a runaway destructive process because the tip sharpening can eventually cause a catastrophic failure in a metallic tip as in well known Spindt emitters. This tip sharpening mechanism can be positively employed in fabrication of a nano probe to create intentional sharpening of the probe tip under an applied electric field.

Figure 7:
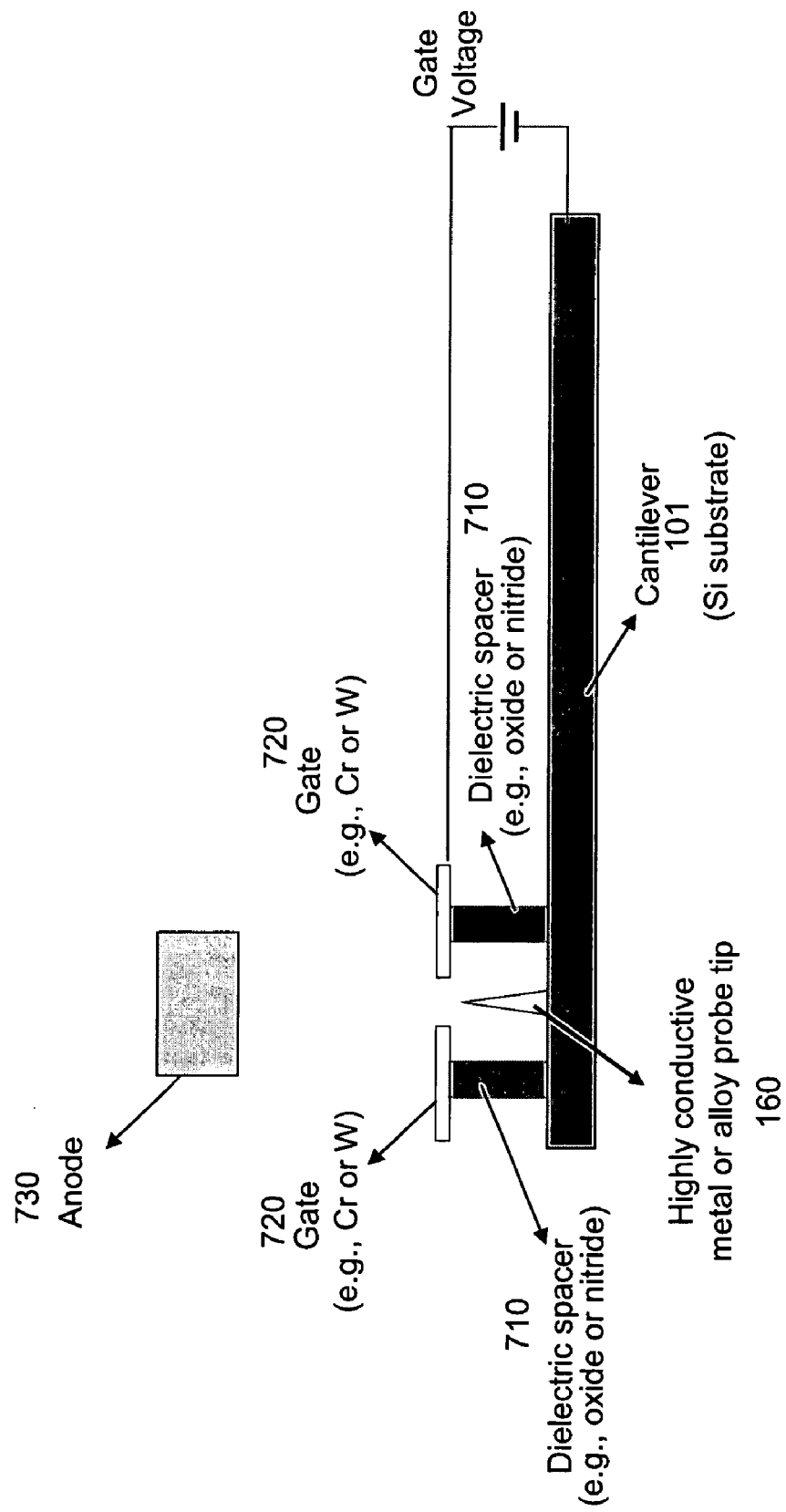
FIGS. 7 and 8 schematically illustrate an example of sharpening the probe tip by electron field emission during fabrication.

FIG. 7 illustrates one example of using the field emission during the fabrication to sharpen the probe tip. In this example, a triode field emitter structure is constructed as part of the fabrication process. Insulator spacers 710 are formed around the nano probe 160 and are higher than the nano probe 160. A gate electrode 720 is then formed on top of each insulator spacer 710. A DC gate voltage is then applied to the gate electrode 720 and the nano probe 160 (via the substrate 101) to effectuate the field emission at the tip of the nano probe 160. An anode 730 may be further placed on top of the nano probe 160 of receive the emitted electrons from the probe tip.

Figure 8:
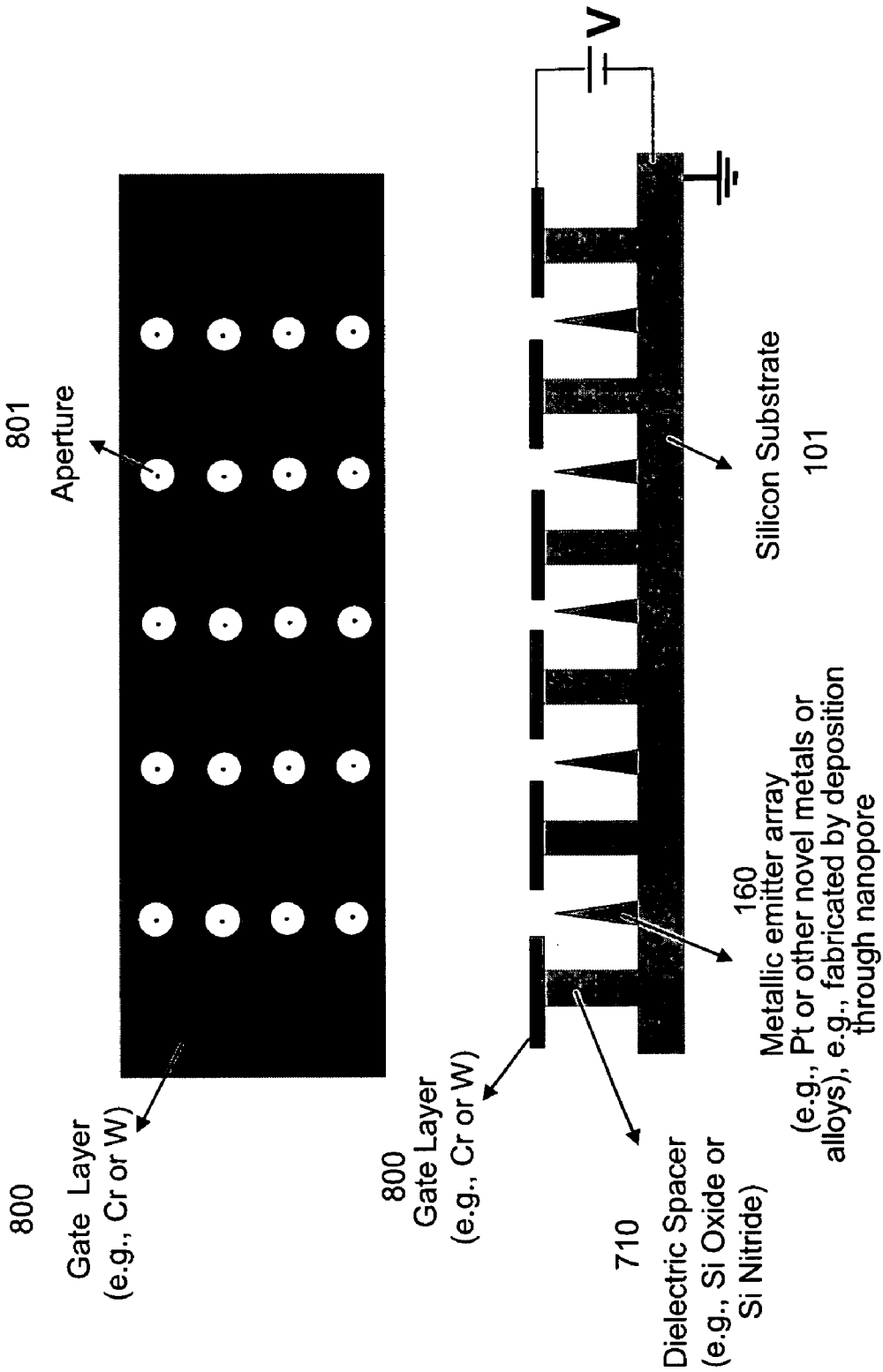

FIG. 8 further shows an implementation of the field emission sharpening in fabricating an array of nano probes 160 on the substrate 101. The gate electrode in the gated triode structure is a gate layer 800 having an array of gate apertures 801 respectively aligned with the underlying nano probes 160. The material for the gate layer 800 may be a layer of Cr or W with a thickness of 100-500 nm. The insulator spacers 710 may be made from a dielectric layer of a thickness from about 200 to 2000 nm thick and may be, e.g., a silicon oxide or a silicon nitride. The substrate 101 may be a silicon substrate or a substrate of a suitable material. The nano probes 160 are either metallic, e.g., Pt or other novel metals or alloys, or insulator probes coated with a metallic layer that covers the tip. The nano probes 160 may be fabricated by deposition through nanopore structures shown in FIGS. 1-3. A high current field emission causes the metallic tip, such as Pt, to be sharpened. The tip sharpness may be in the range of 0.1-20 nm in some implementations, and 0.5-5 nm in other implementations.

Referring back to FIGS. 1-3, the deposition control mask membrane 110 with one or more nanopores 120 may be a separated structure from the triode structure in some implementations. Alternatively, the gate layer 800 with one or more gate apertures 801 may be also used as the deposition control mask membrane where the gate apertures 801 operate as the nanopores for the nano needle deposition. This alternative approach eliminates the separate triode structure for the field emission tip sharpening and simplifies the fabrication process.

In the above examples, the nano probes are made from deposition of a metallic material (elemental metal or alloy based), a ceramic or a semiconductor material. A single-wall or multi-wall carbon nanotube may also be formed on the substrate as the nano probe. For example, a vertical alignment morphology of nanotubes can be fabricated over a silicon substrate by using a DC plasma chemical vapor deposition (CVD) using a mixed gas of acetylene and ammonia at ~700° C. at an applied voltage of ~500 volts or higher at a cathode-anode gap of about 1 cm. These carbon nanocones have a diameter typically in the range of ~200-1000 nm. The nanocones are very sharp at the tip with an estimated radius of curvature below a few nanometers. The nanocones can be grown either vertically or tilted at an angle of 1-90 degrees off the vertical axis by altering the direction of an applied electric field during CVD deposition. The nanotubes can also be made with a bent structure.

The catalytic growth of nanotubes over a substrate (e.g., silicon or glass) is based on decomposition of a hydrocarbon gas over a transition metal as a catalyst to grow nanotubes in a CVD reactor. Hence, an array of carbon nanocones may be fabricated by patterning of catalyst islands (e.g., Ni or Fe islands) using, e.g., an e-beam patterning. The process includes E-beam patterning of Ni or Fe catalyst layer into islands of 50-200 nm diameter followed by plasma CVD growth using hydrocarbon gas (such as acetylene or methane) under an applied electric field. The result of this process is a periodic array of carbon nanocones which can be used as a single probe or an array of sharp and mechanically stable probes for high resolution metrology and other applications. The diameter of carbon nanotubes is an important parameter that has significant implications to the properties and applications of nanotubes to AFM metrology and other applications. Carbon nanotubes with small diameters can be obtained by reducing the catalyst island size for CVD deposition, e.g., by nanoscale patterning such as electron-beam or optical lithography patterning, or by use of pre-made nanoscale catalyst particles. Typical catalyst materials for nanotube growth include Ni, Co, Fe or their alloys.

An exterior coating layer may be formed on each carbon nanotube to functionalize the nanotube in a particular manner for a specific application. For example, a magnetic layer may be coated over a carbon nanotube for magnetic sensing or writing. A highly electrically conductive layer may also be coated over a carbon nanotube for electrical sensing or electron emission. Other coating materials may also be used achieve other tip properties.

Figure 9:
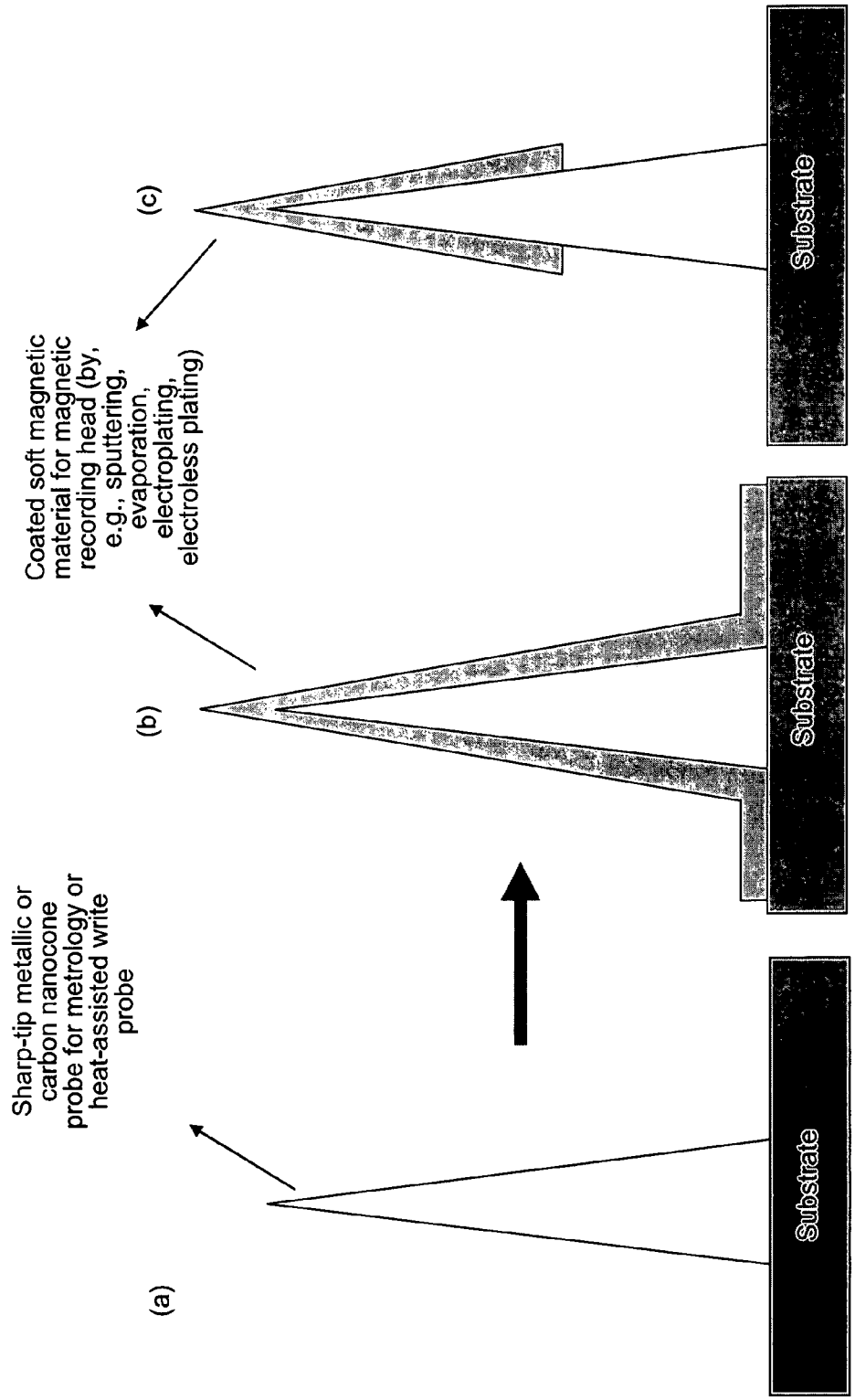
FIGS. 9, 10, 11 and 12 show examples of coating nano probes for achieving various probe properties.

FIG. 9 shows an example of coating a carbon nanotube with a soft magnetic material as a magnetic recording write probe in two different configurations. FIG. 9B shows a carbon nanotube magnetic probe where the entire exterior surface is coated. FIG. 9B shows a carbon nanotube magnetic probe where only the exterior of the tip portion is coated. Examples of soft magnetic coating materials include Ni—Fe permalloys, Fe—Si alloys, Fe—Si—Al sendust soft magnetic alloys, amorphous soft magnetic alloys, soft ferrite such as Ni—Zn ferrites, nanocrystalline soft magnetic alloys such as Fe—Ta—N or Fe—Zr—N based alloy. These materials exhibit desirable soft magnetic properties with coercivity values of less than ~100 Oe, or less than 10 Oe. Known deposition techniques such as physical vapor deposition like sputtering, ion beam deposition, evaporation, chemical vapor deposition, electrodeposition or electroless deposition can be used. After deposition of the coating, an annealing heat treatment can optionally be given to reduce defects and residual stresses for improved soft magnetic properties.

Figure 10:
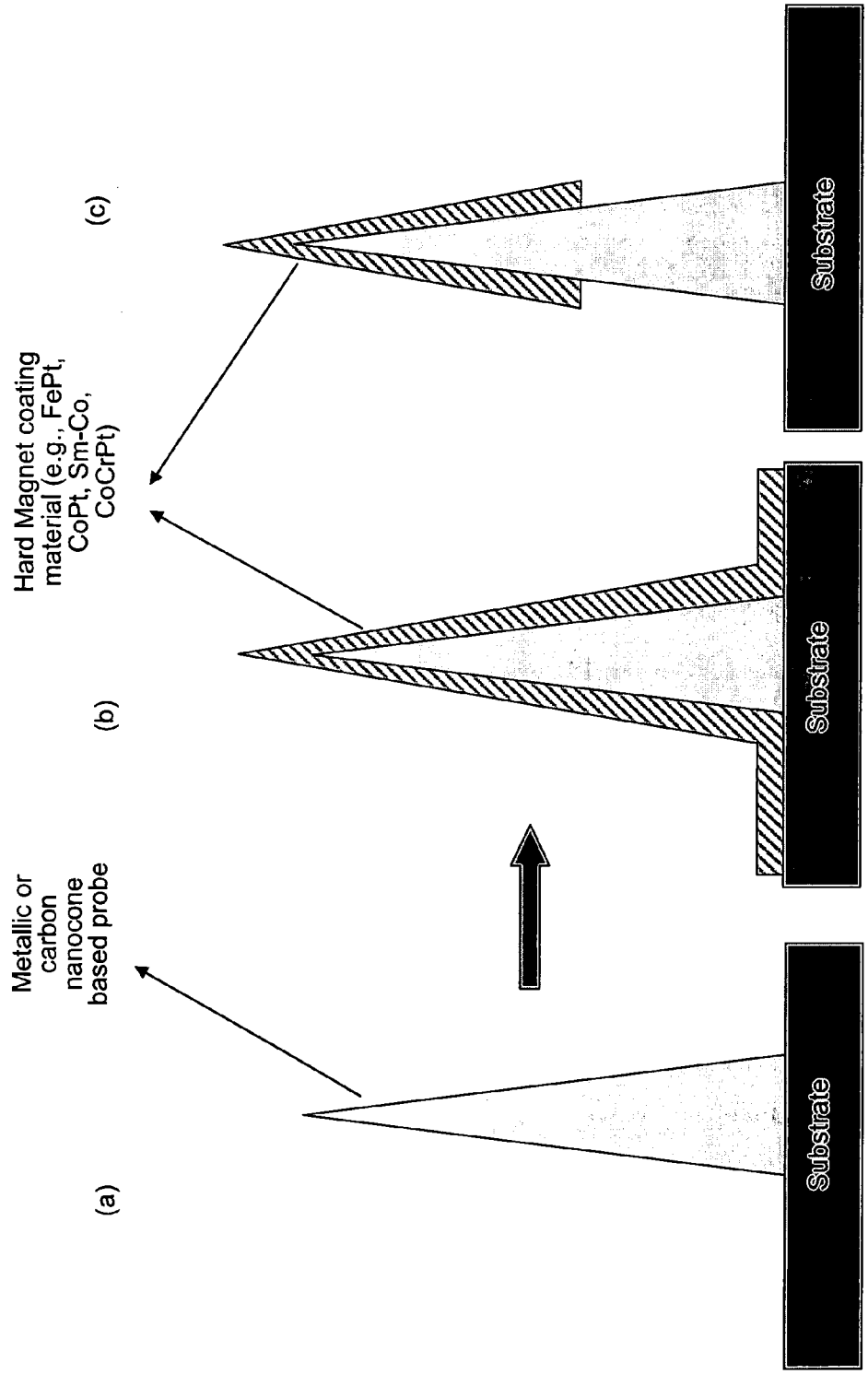

FIG. 10 shows an example of a carbon nanotube probe coated with a hard magnetic coating as a probe for a magnetic force microscope (MFM). A thermal annealing treatment may be applied to the coated carbon nanotube after the coating is deposited. Examples of some desirable coating materials include high coercivity materials with the coercivity values of at least 1000 Oe, or at least 5000 Oe. The hard magnetic materials can be selected form, e.g., FePt, CoPt, Sm—Co alloys, Nd—Fe—Co alloys, CoCrPt magnet alloys, etc.

Figure 11:
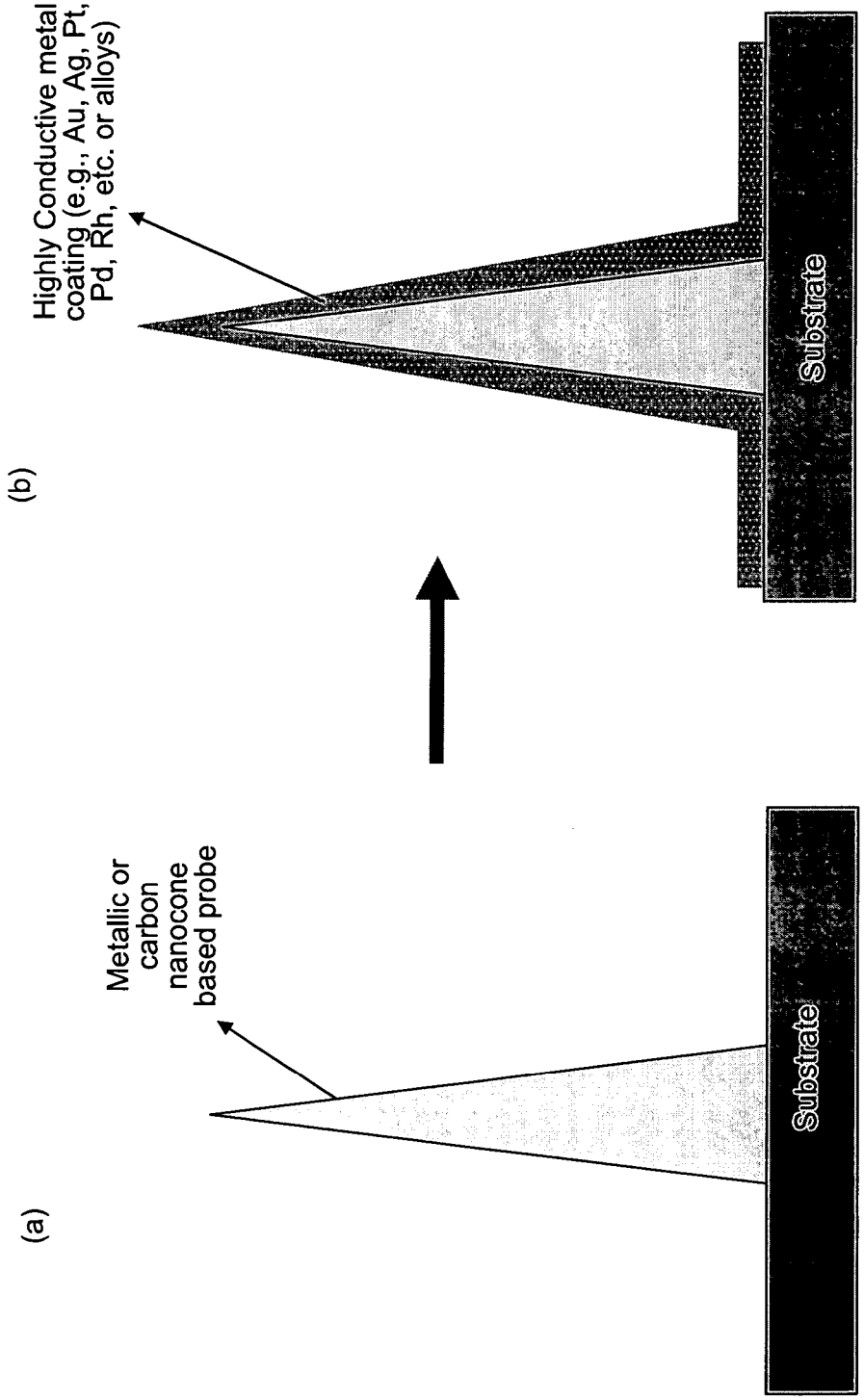

Sharp conductance probes can also be fabricated from the carbon nanocone structure by coating the single or an array of nanocones with highly conductive material such as Au, Ag, Pt, Pd, Rh, Ru or alloys containing one or more of these metals. FIG. 11 illustrates this coating process where both the carbon nanotube and the substrate surface are coated. The coating can be patterned by a suitable patterning process, e.g., the patterning process using the polymer of procepoly(methyl methacrylate) (PMMA) or a shadow mask deposition where a coating is applied through one or more apertures in a mask. As an alternative to a metallic coating, a mechanically harder yet electrically conductive compound coating can also be used for probe applications where a wear resistance is especially desired. A suitable conductive coating materials for such wear resistant probes include conductive carbides or conductive nitrides such as refractory metal carbides and nitrides (e.g., HfC, TaC, WC, ZrC, NbC, MoC, TiC, VC, Cr3C2 and their variations in stoichiometry, and HfN, TaN, WN, ZrN, NbN, MoN, TiN, VN, CrN), as well as some rare earth carbides and nitrides (e.g., cerium nitride).

The above and other coating techniques can also be used for nanocones or nanoprobes fabricated by deposition through gradually clogging nanopores shown in FIGS. 1-3.

Similar to the bent nanoprobe shown in FIG. 3 based on deposition through a gradually clogging nanopore, a carbon nanotube (CNT) probe can also be fabricated to have a bent geometry and can be useful for certain probe applications where the bent geometry provide a better access to a target area than a straight probe geometry. The bent probe configuration can be accomplished during CVD deposition of carbon nanotubes by introducing a change of electrical field direction. The CNT growth in a microwave plasma environment usually produces CNTs aligned perpendicular to the substrate. The plasma environment creates a potential self-bias where the field lines are always perpendicular to the surface. Even when a substrate's surface is tilted at any angle, the field lines will bend and, within a narrow growth region typically less than 10 μm above substrate surface where CNT growth occurs, the field lines tend to be straight and perpendicular to the surface. Electrodes and the substrate may be electrically biased to cause large and dramatic changes in the direction of the electric field lines in the CNT growth region so that the electric field lines are no longer perpendicular to the substrate surface. This configuration causes the CNTs to grow at angles greatly tilted from a perpendicular direction to the substrate surface. The directions of the electric field lines can be adjusted by adjusting the relative position of electrodes during the CVD processes and this change creates a change in the growth direction of the CNTs to produce a bent CNT geometry. The growth direction of nanotubes can be altered in the middle of the CVD growth by using intentionally applied electric field, on the order of several hundred volts. See for example, Aubuchon et al., Nano Lett. 4:1781-1784 (2004). In addition, the growth direction may be controlled to redirect the growth direction of the nanotubes to achieve various structures.

Figure 12:
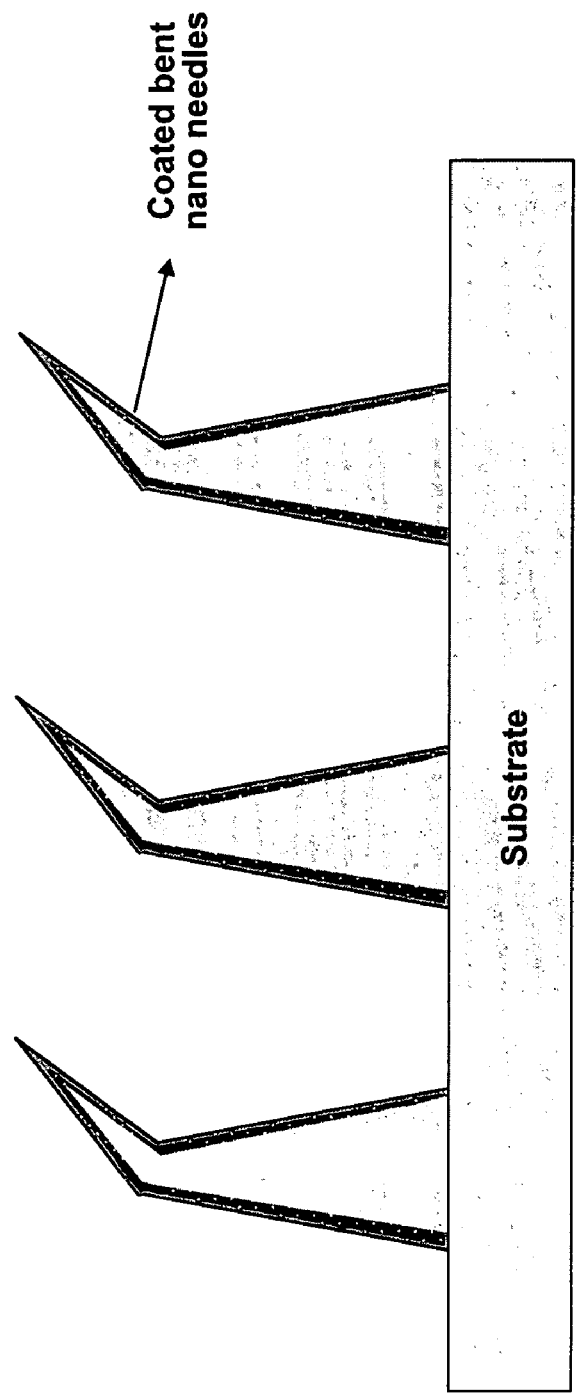

FIG. 12 shows an example of bent CNT probes formed on a substrate. A coating layer is deposited over each bent CNT probe. The coating may be a soft magnetic material, hard magnetic material, electrically highly conductive material, or wear resistant, electrically conductive, carbide or nitride material. Optional annealing after deposition can also be applied if needed.

The above described nano probes made from metallic materials, ceramic materials, semiconductor materials and carbon nanotubes may be used in a wide range of applications. A few examples are described below.

Figure 13:
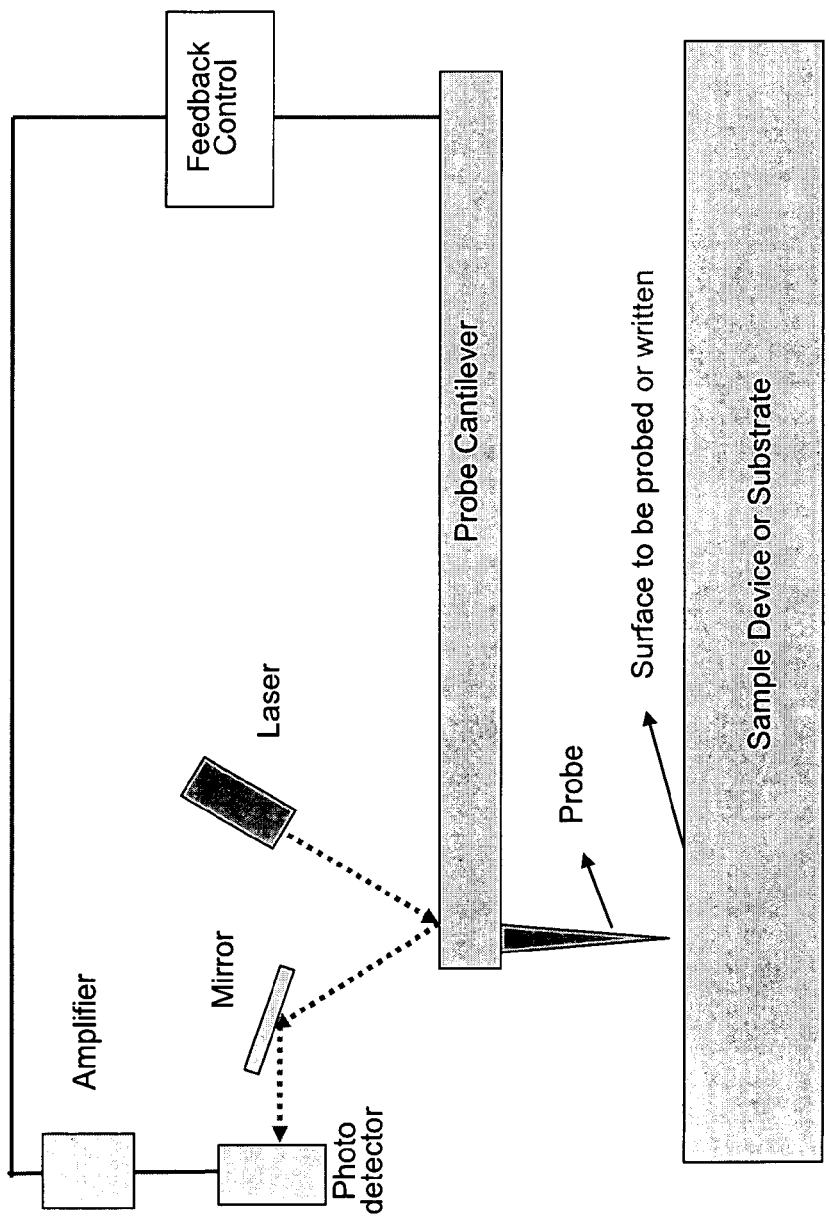
FIG. 13 schematically illustrates an example of a cantilever probe system that uses optical position sensing and a feedback control to monitor and measure the position and movement of the probe at an distal end of the cantilever.

FIG. 13 schematically illustrates an example of a cantilever probe system that uses optical position sensing and a feedback control to monitor and measure the position and movement of the probe at an distal end of the cantilever. The optical position sensing part of the system includes a laser, a reflective surface on the cantilever to reflect the light from the laser, one or more mirrors to guide the reflected light from the canilever, and a photodetector to receive the reflected light. The output of the photodetector is sent to the feedback control. Hence, the laser beam controls the positioning and feedback control of the nanoprobe. The system in FIG. 13 may be used as a AFM probe, MFM probe, Mechanical Tester Probe, Nano-indent Mechanical Tester, Conductance Probe, Heat-Assisted Write Probe, or Magnetic Recording Probe.

Figure 14:
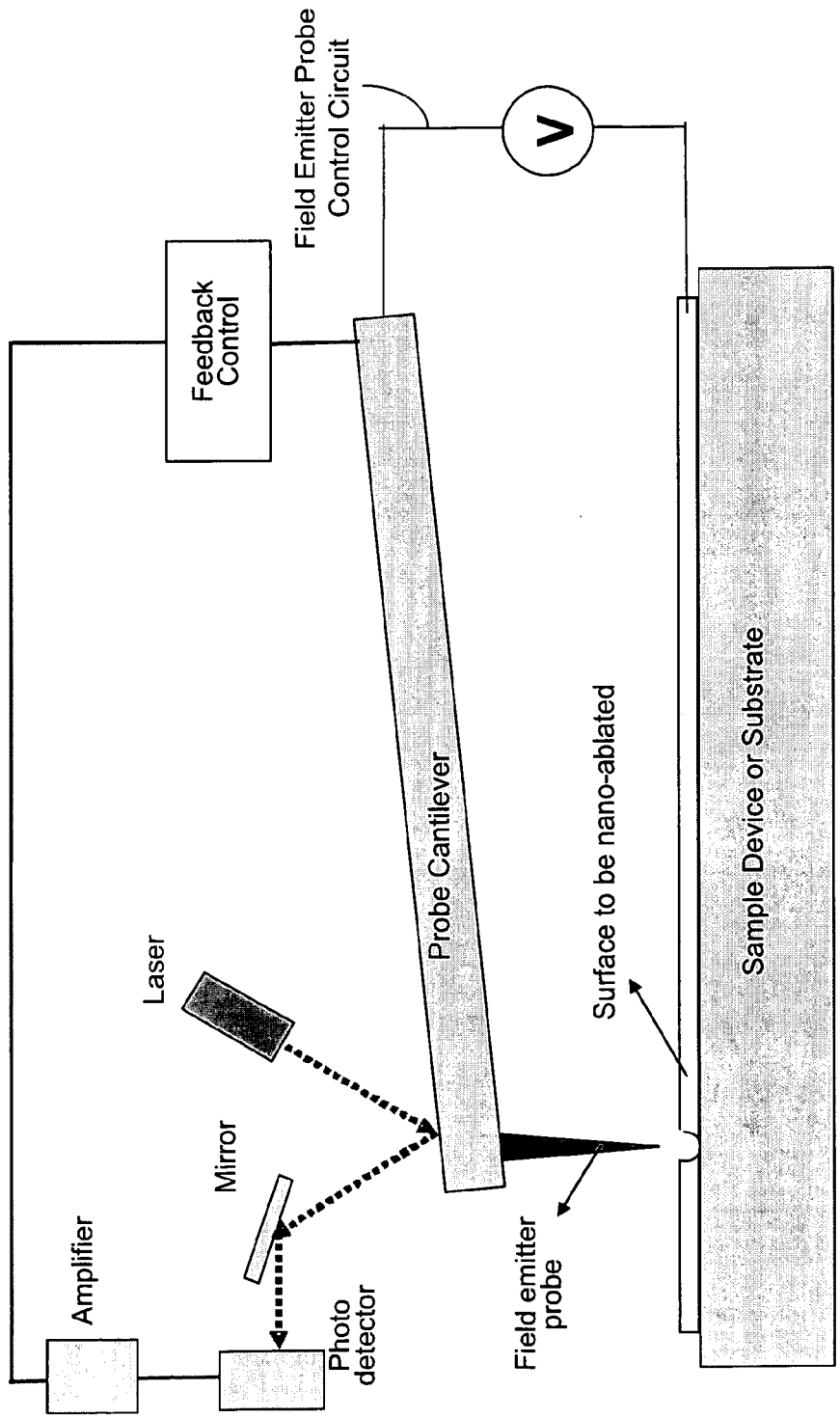
FIG. 14 shows an example of a nano-ablation device that uses a field emitter probe to emit electrons to ablate a target surface.

FIG. 14 shows an example of a nano-ablation device that uses an electron field emitter probe to emit electrons to ablate a target surface. The field emitter probe located at a distal end of the probe cantilever may be made from any one of the probe designs described in this application. A control circuit is used to electrically bias the probe cantilever and the field emitter probe with respect to the sample device or substrate to cause field emission at the probe tip. This device can be used to remove material from a target area on the sample device or substrate by directing the emitted electrons to bombard the target area and may be used for patterning a feature. As illustrated, a portion of the surface on the sample device or substrate is selected by the probe and is removed. Alternatively, instead of ablating and removing material, the field emitter or an array of field emitter can selectively expose local regions on a layer of electron-beam resist material, for example, 1-50 nm thick PMMA (poly methyl methacrylate) spin coated on a layer or a substrate to be nano-patterned. The e-beam exposed nano regions by the tip of the electron-emitting probe can be either dissolved away or left untouched (depending on the types of resist material), and the resist nano patterns so obtained can then be utilized to obtain a patterned nanostructure, for example, by depositing a thin metal layer and carrying out a what is known as a "lift-off" process to ratin only the metal regions deposited in the valley of the e-beam pattern. Alternatively, the resist pattern can be utilized as a chemical etch or a reactive ion etch in such a way that the substrate or a pre-deposited metal layer material underneath the valley regions in the resist pattern are preferentially etched to form a nano pattern.

Figure 15:
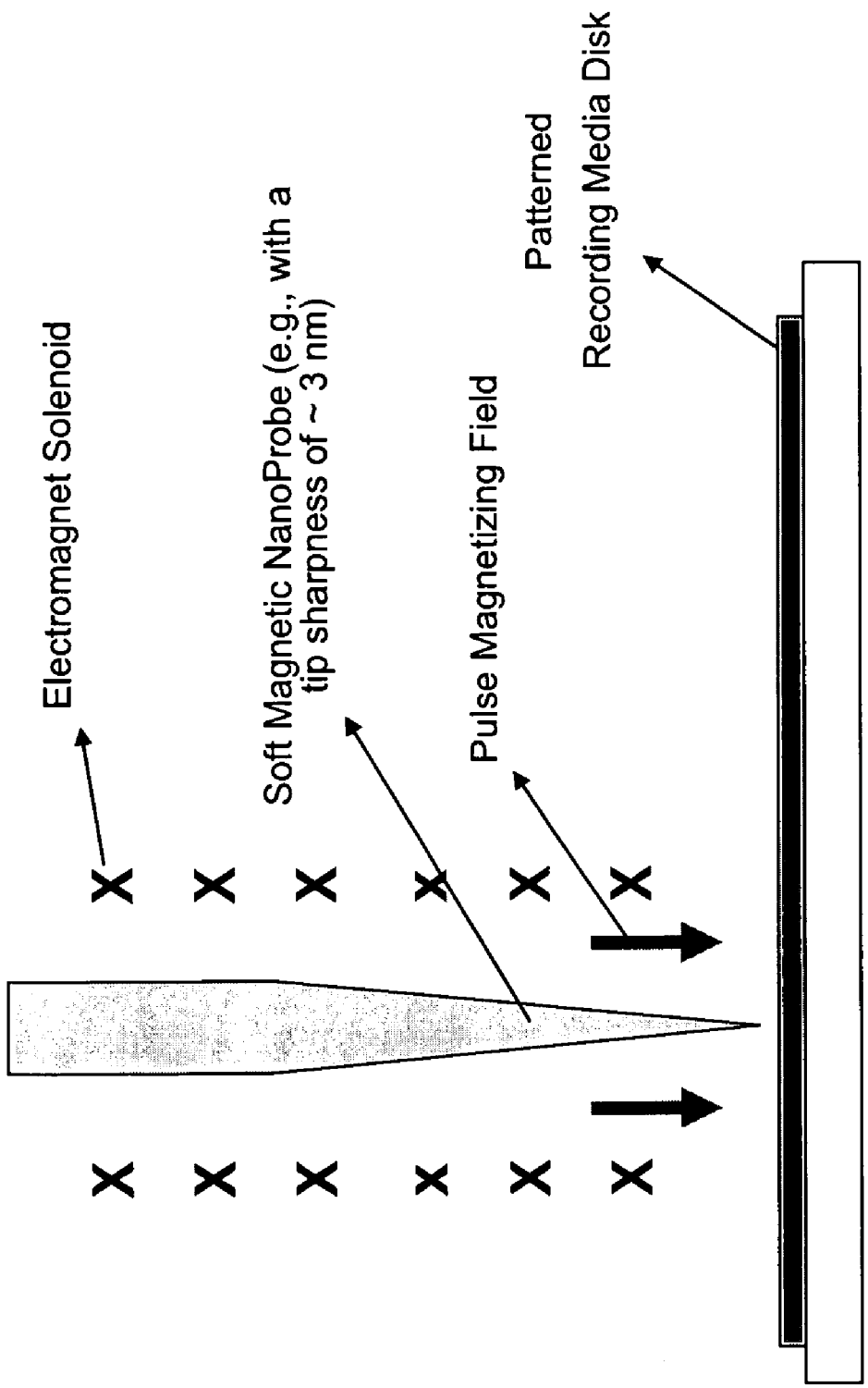
FIG. 15 schematically illustrates a nanoscale magnetic write-head based on one of the described nano probes with the pulse magnetic field supplied by a solenoid.
Figure 16:
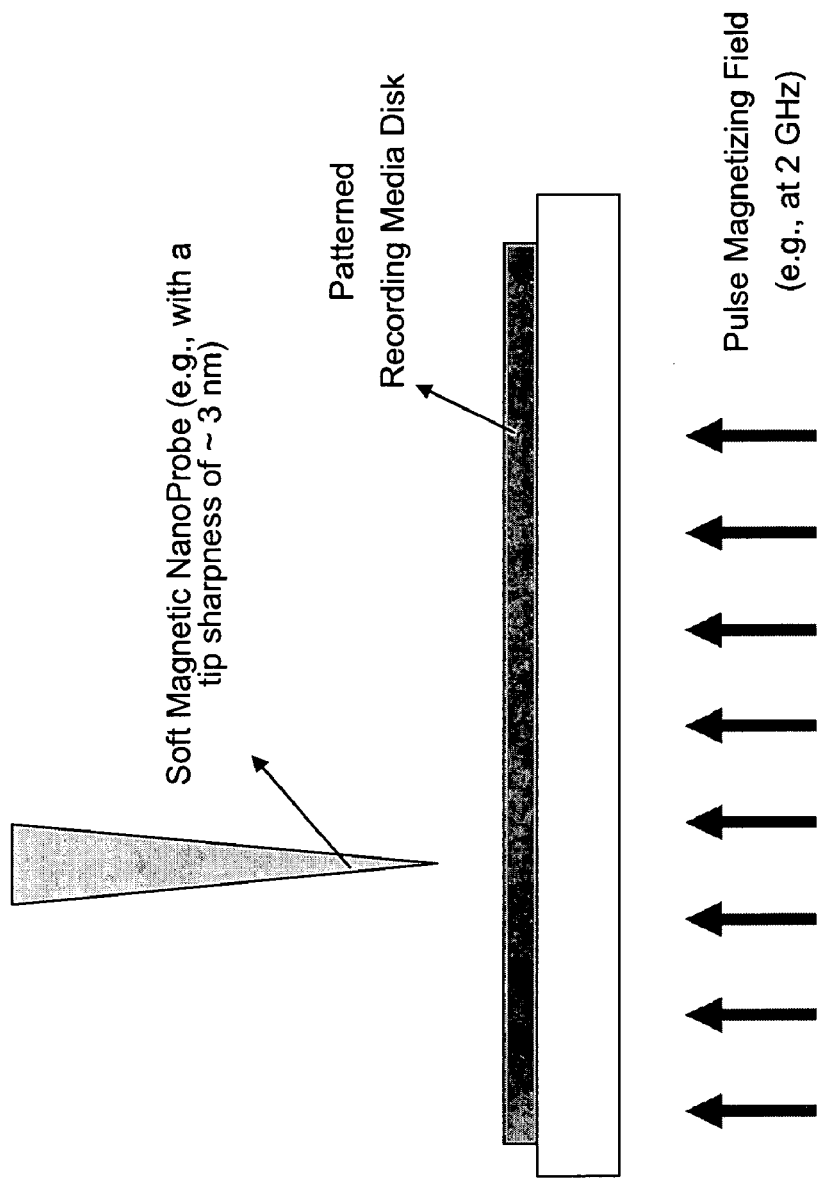
FIG. 16 schematically illustrates another example of magnetic based on the nano probes described herein with the pulse magnetic field supplied from underneath the magnetic disk.

FIGS. 15 and 16 further show exemplary, ultra-high-density magnetic read/write heads based on nanoprobes described in this application. In FIG. 15, an electromagnet such as a solenoid and a soft magnet nanoprobe core are used as magnetic read/write head. The electron magnetic solenoid can be used to supply a high frequency magnetic write-field for magnetization of each information bit on a magnetic recording disk. FIG. 16 shows a magnetic write head using a magnetic nanoprobe described in this application. As part of the write head, a field supply module of the head is positioned on the opposite side of the recording medium and moves with the magnetic nanoprobe in synchronization. The field supply module of the head generates and directs the magnetizing field from underneath the recording medium during the writing operation. This configuration can be used to simplify the write head design. The recording write head of FIG. 15 and FIG. 16 can also be used as a read head, as the magnetic signal emanating from each of the recorded magnetic bits on the disk surface causes inductive voltage signal in the sense coil positioned around the soft magnetic nanoprobe core.

For ultra-high-density magnetic read/write, for example, a patterned media with each magnetic bit size to write or to read being in the nanometer regime, the desired soft magnetic nanoprobe tip for the inventive read/write head should have a small tip radius of curvature comparably to the diameter of magnetic bit size. For a 1.6-terabit per square inch recording density, the bit size is estimated to be ~10 nm diameter with 10 nm spacing. For a 6.4-terabit per square inch recording density, the bit size is estimated to be ~5 nm diameter with 5 nm spacing. The desired tip sharpness is dependent on the recording density of the hard disk media, and may be in the range of ~1-20 nm, or 1-5 nm. The applied field is concentrated into a small volume near the tip for effective magnetization writing on a hard disk recording media. Such a small tip end, if it were alone, could behave as a single domain magnet with an undesirable high coercive force, however, the thicker diameter regions immediately above the tip region will be magnetically softer and can be easily magnetically switched, thus causing the tip region to magnetically switch easier. The tapered geometry of the magnetic read/write head in FIGS. 15 and 16 is therefore important.

Examples of soft magnetic nanoprobe materials for the nanoprobes of FIGS. 15 and 16 include Ni—Fe permalloys, Fe—Si alloys, Fe—Si—Al sendust soft magnetic alloys, amorphous soft magnetic alloys, soft ferrite such as Ni—Zn ferrites, nanocrystalline soft magnetic alloys such as Fe—Ta—N or Fe—Zr—N based alloy. These materials exhibit desirable soft magnetic properties with coercivity values of less than ~100 Oe, or less than 10 Oe. These soft magnetic nanoprobes can be optionally annealed for stress relaxation and improved magnetic properties.

For electrical conductance measurements involving a liquid medium, for example, bio-conductance measurements or ionic conductance measurements near the ion channels of living or simulated cell membranes, the sidewall of the nanoprobes needs to be coated with an electrical insulator (e.g., a dielectric material) so that the measurement current does not diverge or leak in the fluid environment of a biological sample. For these purposes, a nanoprobe described in this application may be optionally coated with an insulator layer to expose only the tip portion of the nanoprobe for conductance measurements. The insulator may be a polymer, oxide or nitride material and may be coated by physical vapor deposition, chemical vapor deposition, chemical or electrochemical deposition. The tip opening can be accomplished by preferential chemical or electrochemical etching, laser ablation, reactive ion etching, and various other means.

While this application contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Only a few implementations are described. Other implementations and variations, enhancements and modifications are possible.

What is claimed is:

1. A method, comprising:
placing a mask membrane and a substrate to be processed at two different positions relative to each other within a deposition chamber, the mask membrane comprising a through hole;
directing a flow of a deposition material towards the mask membrane and the substrate through the through hole of the mask membrane to deposit the deposition material onto the mask membrane including the through hole and the substrate; and
controlling a duration of the flow of the deposition material to form a tapered structure on the substrate whose dimension reduces along a direction from the substrate towards a tip of the tapered structure,
wherein the through hole is formed to have a tapered opening that narrows from the mask towards the substrate.

2. The method as in claim 1, further comprising:
using a magnetic material as the deposition material.

3. The method as in claim 1, further comprising:
using a metallic material as the deposition material.

4. The method as in claim 1, further comprising:
using an electrically conductive material as the deposition material.

5. The method as in claim 1, further comprising:
using a wear-resistant material as the deposition material.

6. The method as in claim 1, further comprising:
using an electrically conductive material as the deposition material; and
after formation of the tapered structure, applying an electrical field to the tapered structure to effectuate field emission of electrons at the tip to sharpen the tip.

7. The method as in claim 6, further comprising:
providing a gate electrode near the tip of the tapered structure
applying a control voltage between a gate electrode and the tapered structure to effectuate the electrical field for the field emission at the tip.

8. The method as in claim 6, further comprising:
using an electrically conductive material as the mask membrane; and
applying a control voltage between the mask membrane and the tapered structure to effectuate the electrical field for the field emission at the tip.

9. The method as in claim 6, further comprising:
forming a coating layer over at least a portion of the tapered structure.

10. The method as in claim 1, further comprising:
forming a coating layer over at least a portion of the tapered structure.

11. The method as in claim 10, wherein:
the coating layer is a magnetic layer.

12. The method as in claim 10, wherein:
the coating layer is an electrically conductive layer.

13. The method as in claim 10, further comprising:
after formation of the tapered structure, forming a locking layer over the tapered structure and the substrate to contiguously cover at least a lower portion of the tapered structure near the substrate and the substrate to enhance adhesion between the tapered structure and the substrate.

14. The method as in claim 13, wherein:
the locking layer is a metallic layer.

15. The method as in claim 13, wherein:
the locking layer is a polymer layer.

16. The method as in claim 13, wherein:
the locking layer is a ceramic layer.

17. The method as in claim 13, wherein:
the locking layer exposes the tip of the tapered structure.

18. The method as in claim 1, further comprising:
prior to directing the flow of the deposition material towards the mask membrane and to the substrate, forming an adhesion layer over the substrate, wherein the tapered structure is next deposited on the adhesion layer; and
applying an annealing treatment to cause a heat-induced bonding at an interface between the tapered structure and the adhesion layer.

19. The method as in claim 18, wherein:
the adhesion layer is a metallic layer.

20. The method as in claim 1, further comprising:
using at least a first material and a second material as the deposition material to form the tapered structure directly on the substrate, wherein the substrate is made of the first material; and
controlling a relative ratio between the first and the second materials to (1) make the deposition material contain more the first material than the second material at a beginning of the deposition of the deposition material onto the substrate through the through hole in the mask membrane, and (2) to decrease an amount of the first material and to increase an amount of the second material after the beginning of the deposition of the deposition material onto the substrate.

21. The method as in claim 20, wherein:
the second material is a metallic material.

22. The method as in claim 21, wherein:
the first material is silicon and the second material is one of Ti, Cr, Zr, Nb, and Ta.

23. The method as in claim 1, further comprising:
maintaining the mask membrane and the substrate at a fixed relative position with respect to each other at a beginning period of depositing the deposition material onto the substrate via the through hole in the mask membrane to form a first portion of the tapered structure; and
moving the mask membrane and the substrate relative to each other along a direction after the beginning period, while continuing to direct the flow of the deposition material towards the mask membrane and the substrate, to form a second portion of the tapered structure that orients at a different direction from the first portion.

* * * * *